und States Patent US 11,113,395 B2
Abbaszadeh Sep. 7, 2021

(54) SYSTEM AND METHOD FOR ANOMALY AND CYBER-THREAT DETECTION IN A WIND TURBINE

(71) Applicant: General Electric Company, Schenectady, NY (US)

(72) Inventor: Masoud Abbaszadeh, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 396 days.

(21) Appl. No.: 15/988,515

(22) Filed: May 24, 2018

(65) Prior Publication Data

US 2019/0362070 A1 Nov. 28, 2019

(51) Int. Cl.
*G06F 21/55* (2013.01)
*F03D 17/00* (2016.01)
*F03D 7/04* (2006.01)

(52) U.S. Cl.
CPC ........... *G06F 21/554* (2013.01); *F03D 7/045* (2013.01); *F03D 17/00* (2016.05)

(58) Field of Classification Search
CPC ........ G06F 21/554; G06F 21/55; F03D 17/00; F03D 7/045; F03D 80/00; F05B 2270/335;
(Continued)

(56) References Cited

U.S. PATENT DOCUMENTS 8,219,356 B2 7/2012 Mihok et al.
9,379,951 B2 6/2016 Mihnev
(Continued)

FOREIGN PATENT DOCUMENTS

EP 3 239 884 A1 11/2017
KR 2014 0109132 A 9/2014
WO WO-2017028866 A1 * 2/2017 ............. F03D 17/00

OTHER PUBLICATIONS

Amarjit Datta, Mohammad Ashiqur Rahman; "Cyber Threat Analysis Framework for the Wind Energy Based Power System"; CPS '17: Proceedings of the 2017 Workshop on Cyber-Physical Systems Security and Privacy; Nov. 2017; pp. 81-92 (Year: 2017).*

(Continued)

*Primary Examiner* — Kendall Dolly
*Assistant Examiner* — Courtney D Fields
(74) *Attorney, Agent, or Firm* — Dority & Manning, P.A.

(57) ABSTRACT

According to some embodiments, a plurality of monitoring nodes each generate a series of current monitoring node values over time that represent a current operation of a wind turbine. An abnormality detection computer platform may receive the series of current monitoring node values and generate a set of current feature vectors. The abnormality detection computer platform may also access an abnormality detection model having a plurality of decision boundaries created using wind information (e.g., wind speed and/or acceleration) along with at least one of a set of normal feature vectors and a set of abnormal feature vectors. The abnormality detection computer platform may then select one of the decision boundaries based on current wind information associated with the wind turbine and execute the abnormality detection model and transmit an abnormality alert signal based on the set of current feature vectors and the selected decision boundary.

17 Claims, 21 Drawing Sheets

(58) Field of Classification Search
CPC ............. F05B 2260/84; F05B 2270/32; H04L 63/1425
See application file for complete search history.

(56) References Cited

U.S. PATENT DOCUMENTS

| | | |
|---|---|---|
| 9,483,049 B2 | 11/2016 | Maeda et al. |
| 2014/0103652 A1* | 4/2014 | Ubben .................... F03D 7/048 290/44 |
| 2016/0333855 A1* | 11/2016 | Lund ....................... F03D 7/048 |
| 2017/0284896 A1 | 10/2017 | Harpale et al. |
| 2017/0310690 A1 | 10/2017 | Mestha et al. |
| 2017/0352245 A1 | 12/2017 | Maher et al. |
| 2018/0137277 A1 | 5/2018 | Mestha et al. |

OTHER PUBLICATIONS

EPO Search Report, dated Aug. 19, 2019.
Yampikulsakul, Nattavut et al., "Condition Monitoring of Wind Power System With Nonparametric Regression Analysis", IEEE Transactions on Energy Conversion, vol. 29, Issue: 2, Jun. 2014, DOI: 10.1109/TEC.2013.2295301, (pp. 288-299, 12 total pages).
Datta, Amarjit et al., "Cyber Threat Analysis Framework for the Wind Energy Based Power System", Proceeding CPS' 17 Proceedings of the 2017 Workshop on Cyber-Physical Systems Security and Privacy, Nov. 3, 2017, DOI: 10.1145/3140241.3140247, ISBN: 978-1-4503-5394-6, (pp. 81-92, 12 total pages).

\* cited by examiner

| STATUS | | PREDICTED CLASS 2110 | |
|---|---|---|---|
| ELM | % | NORMAL | ABNORMAL |
| ACTUAL CLASS 2120 | NORMAL | 98.64 | 1.36 |
| | ABNORMAL | 0 | 100 |

*FIG. 21*

SYSTEM AND METHOD FOR ANOMALY AND CYBER-THREAT DETECTION IN A WIND TURBINE

BACKGROUND

Industrial control systems that operate wind turbines are increasingly connected to the Internet. As a result, these control systems are vulnerable to threats, such as cyber-attacks (e.g., associated with a computer virus, malicious software, etc.) that could disrupt electric power generation and distribution, damage turbines, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a wind turbine. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect wind turbines, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect a wind turbine from cyber-attacks in an automatic and accurate manner even when attacks percolate through the IT and OT layers and directly harm control systems.

SUMMARY

According to some embodiments, a plurality of monitoring nodes each generate a series of current monitoring node values over time that represent a current operation of a wind turbine. An abnormality detection computer platform may receive the series of current monitoring node values and generate a set of current feature vectors. The abnormality detection computer platform may also access an abnormality detection model having a plurality of decision boundaries created using wind information (e.g., wind speed and/or acceleration) along with at least one of a set of normal feature vectors and a set of abnormal feature vectors. The abnormality detection computer platform may then select one of the decision boundaries based on current wind information associated with the wind turbine and execute the abnormality detection model and transmit an abnormality alert signal based on the set of current feature vectors and the selected decision boundary Some embodiments comprise: means for receiving a series of current monitoring node values from a plurality of monitoring nodes each generating a series of current monitoring node values over time that represent a current operation of a wind turbine; means for generating a set of current feature vectors based on the series of current monitoring node values; means for accessing, by an abnormality detection computer platform, an abnormality detection model having a plurality of decision boundaries created using wind information along with at least one of a set of normal feature vectors and a set of abnormal feature vectors; means for selecting one of the decision boundaries based on current wind information associated with the wind turbine; and means for executing the abnormality detection model and transmitting an abnormality alert signal based on the set of current feature vectors and the selected decision boundary Some technical advantages of some embodiments disclosed herein are improved systems and methods to protect one or more wind turbines from cyber-attacks and faults in an automatic and accurate manner.

BRIEF DESCRIPTION OF THE DRAWINGS

FIG. 21 is one example of evaluation results for a wind turbine protection system according to some embodiments.

DETAILED DESCRIPTION

Figure 1:
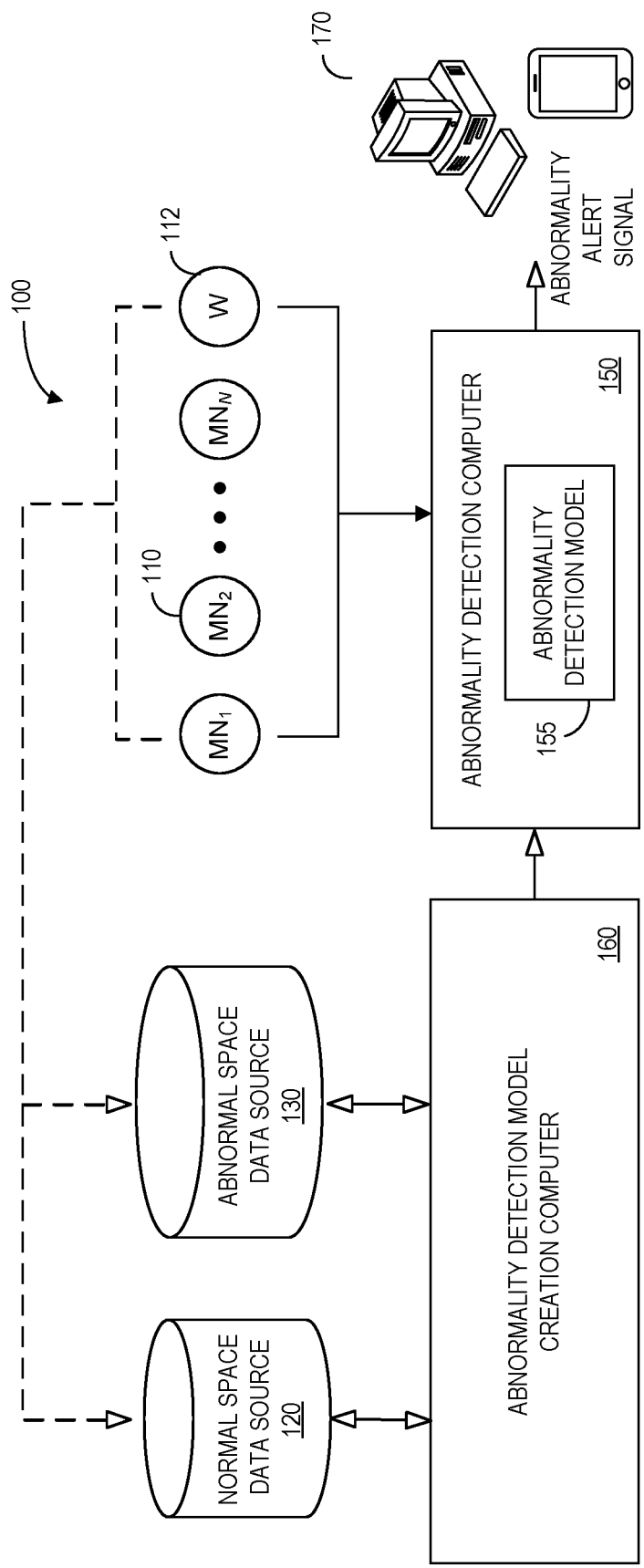
FIG. 1 is a high-level block diagram of a wind turbine abnormality model creation system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein may provide a system and method for reliable cyber-threat detection for a wind turbine. Note that wind farms are usually in remote geographical locations and critical failure-prone components (such as pitch systems) may be located at hard-to-reach locations in the turbine (and, as a result, the cost of maintenance associated with failures that are not detected quickly could be substantial). To avoid such a result, given wind information (e.g., wind speed and/or acceleration) along with a plurality of monitoring nodes values over time (e.g., sensor, actuator, and/or controller nodes), a set of abnormality detection decision boundaries may be built in feature space. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. The features may be computed at the local level (associated with each monitoring node) and/or the global level (associated with all the monitoring nodes, i.e., an entire wind turbine or a farm of wind turbines). The time-domain values of the nodes or their extracted features may be, according to some embodiments, normalized for better numerical conditioning.

FIG. 1 is a high-level architecture of a system 100 in accordance with some embodiments. The system 100 may include monitoring node sensors 110 $MN_1$ through $MN_N$, a wind monitoring node sensor 112 W, a "normal space" data source 120, and an "abnormal space" data source 130. The normal space data source 120 might store, for each of the plurality of monitoring nodes 110, a series of normal values over time that represent normal operation of a wind turbine (e.g., generated by a model or collected from actual sensor data as illustrated by the dashed line in FIG. 1). The abnormal space data source 130 might store, for each of the monitoring nodes 110, a series of attacked values that represent an abnormal operation of the wind turbine (e.g., when the system is experiencing one or more cyber-attacks and/or faults).

Information from the normal space data source 120 and the abnormal space data source 130 may be provided to an abnormality detection model creation computer 160 that uses this data to create a set of decision boundaries (that is, boundaries that separates normal behavior from abnormal behavior in various wind conditions). The decision boundary may then be used by an abnormality detection computer 150 executing an abnormality detection model 155. The abnormality detection model 155 may, for example, monitor streams of data from the monitoring nodes 110, 112 comprising data from sensor nodes, actuator nodes, and/or any other critical monitoring nodes (e.g., sensor nodes $MN_1$ through $MN_N$ and W) and automatically output an abnormality alert signal to one or more remote monitoring devices 170 when appropriate (e.g., for display to an operator). As used herein, the term "automatically" may refer to, for example, actions that can be performed with little or no human intervention. According to some embodiments, information about detected abnormalities may be transmitted back to a wind turbine control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 160 may store information into and/or retrieve information from various data stores, such as the normal space data source 120 and/or the abnormal space data source 130. The various data sources may be locally stored or reside remote from the abnormality detection model creation computer 160. Although a single abnormality detection model creation computer 160 is shown in FIG. 1, any number of such devices may be included. Moreover, various devices described herein might be combined according to embodiments of the present invention. For example, in some embodiments, the abnormality detection model creation computer 160 and one or more data sources 120, 130 might comprise a single apparatus. The abnormality detection model creation computer 160 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage abnormality information in accordance with any of the embodiments described herein. In some cases, an interactive graphical display interface may let a user define and/or adjust certain parameters (e.g., abnormality detection trigger levels) and/or provide or receive automatically generated recommendations or results from the abnormality detection model creation computer 160 and/or abnormality detection computer 150.

Figure 2:
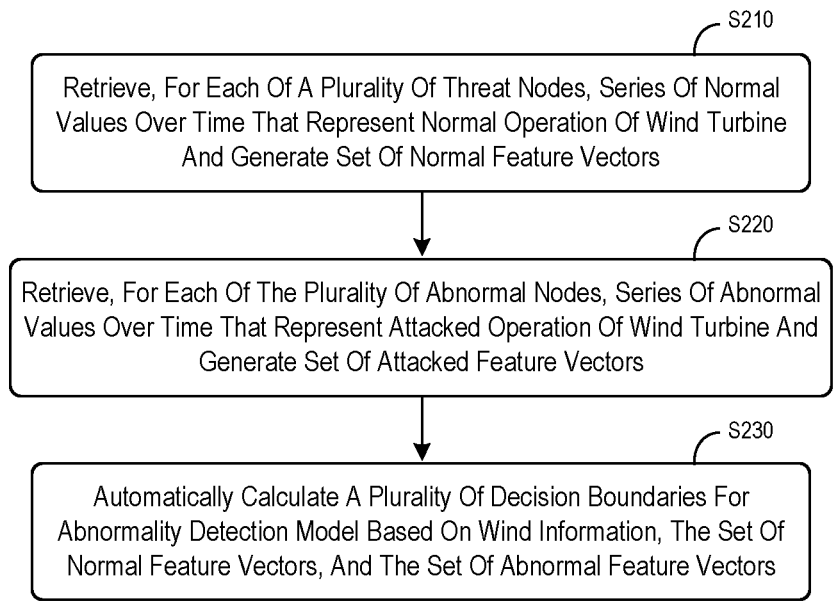
FIG. 2 is a wind turbine model creation method according to some embodiments.

For example, FIG. 2 illustrates a model creation method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, for each of a plurality of monitoring nodes, a series of normal values over time that represent normal operation of a wind turbine and a set of normal feature vectors may be generated. Similarly, at S220 the system may retrieve, for each of the plurality of monitoring nodes, a series of abnormal values over time that represent an abnormal operation of the wind turbine and a set of abnormal feature vectors may be generated. The series of normal and/or abnormal values might be obtained, for example, by running Design of Experiments ("DoE") on a wind turbine. At S230, a set of decision boundaries may be automatically calculated for an abnormality detection model based on wind information (e.g., wind speed and/or acceleration), the set of normal feature vectors, and the set of abnormal feature vectors. According to some embodiments, each decision boundary might be associated with a line, a hyperplane, and/or a non-linear boundary separating normal space from abnormal space. Moreover, a decision boundary might comprise a multi-class decision boundary separating normal space, attacked space, and degraded operation space (e.g., associated with a wind turbine fault). In addition, note that the abnormality detection model might be associated with feature mapping functions and/or feature parameters.

Figure 3:
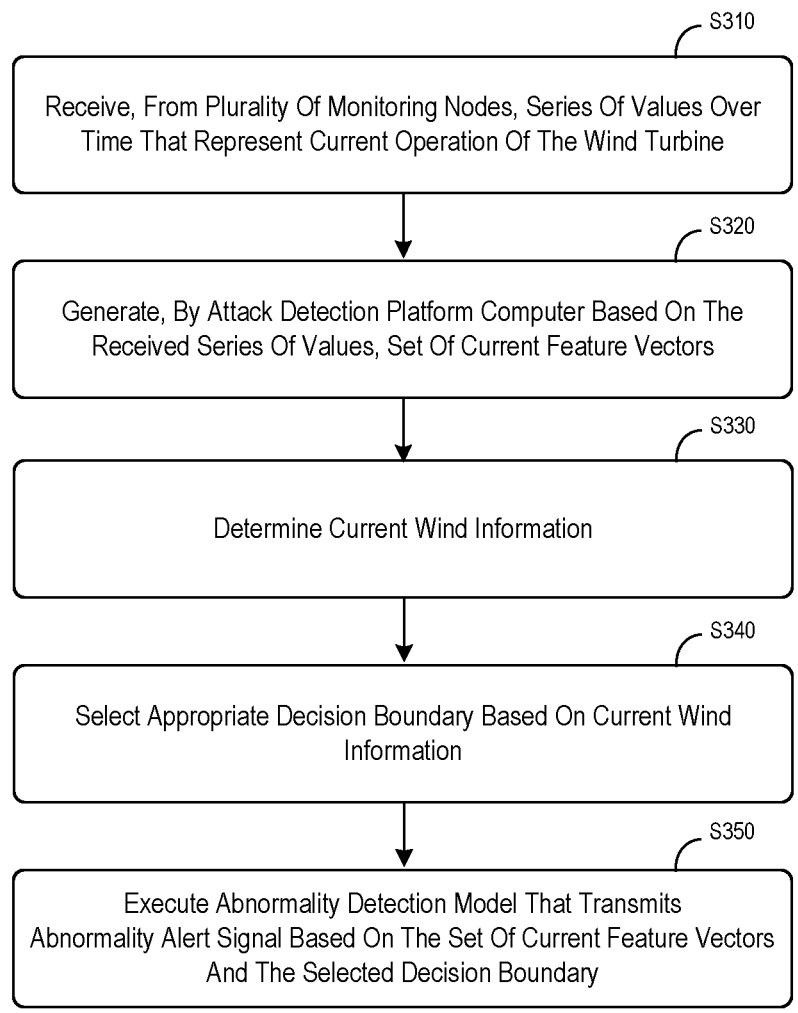
FIG. 3 is as wind turbine abnormality alert method according to some embodiments.

The decision boundaries can then be used to detect cyber-attacks and/or faults associated with a wind turbine. For example, FIG. 3 is an abnormality alert method according to some embodiments. At S310, the system may receive, from a plurality of monitoring nodes, a series of current values over time that represent a current operation of a wind turbine. At S320, an abnormality detection platform computer may then generate, based on the received series of current values, a set of current feature vectors.

At S330, the system may determine current wind information. For example, the system may determine a current wind speed, a current wind acceleration, or other type of wind information (e.g., identifying a wind gust). At S340, the system selects an appropriate decision boundary based on the current wind information. At S350, an abnormality detection model may be executed to transmit an abnormality alert signal based on the set of current feature vectors and the selected decision boundary when appropriate (e.g., when a cyber-attack or fault is detected). According to some embodiments, one or more response actions may be performed when an abnormality alert signal is transmitted. For example, the system might automatically shut down all or a portion of the wind turbine (e.g., to let the detected potential cyber-attack or fault be further investigated). As other examples, one or more parameters might be automatically modified, a software application might be automatically triggered to capture data and/or isolate possible causes, etc.

Some embodiments described herein may take advantage of the physics of a wind turbine control system by learning a priori from tuned high-fidelity equipment models and/or actual "on the job" data to detect single or multiple simultaneous adversarial threats to the system or naturally occurring faults. Moreover, according to some embodiments, all monitoring node data may be converted to features using advanced feature-based methods, and the real-time operation of the wind turbine control system may be monitoring in substantially real-time. Abnormalities may be detected by classifying the monitored data as being "normal" or disrupted (or degraded). Each decision boundary may be constructed using dynamic models and may help enable early detection of vulnerabilities (and potentially avert catastrophic failures) allowing an operator to restore the wind turbine control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 4:
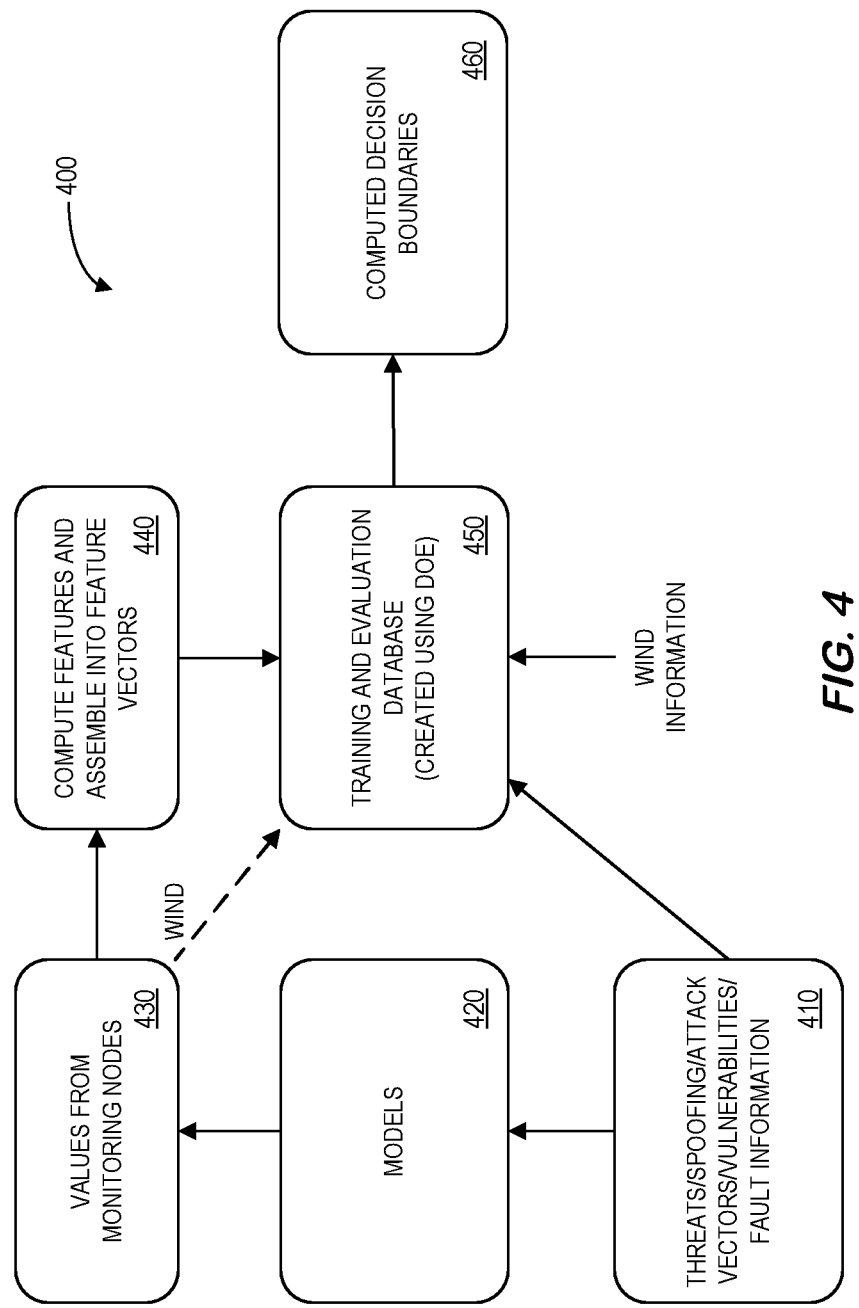
FIG. 4 illustrates an off-line process in accordance with some embodiments.

FIG. 4 illustrates an off-line boundary creation process 400 in accordance with some embodiments. Information about threats, spoofing, attack vectors, vulnerabilities, faults, etc. 410 may be provided to models 420 and/or a training and evaluation database 450 created using DoE techniques. The models 420 may, for example, simulate data 430 from monitoring nodes to be used to compute features that are assembled into a feature vector 440 to be stored in the training and evaluation database 450. The data in the training and evaluation database 450 may then be used to compute decision boundaries 460 to distinguish between normal operation and abnormal operation. According to some embodiments, the process 400 may include a prioritization of monitoring nodes and anticipated attack or fault vectors to form one or more data sets to develop decision boundaries. Attack vectors are abnormal values at critical inputs where malicious attacks can be created at the domain level that will make the system go into threatened/abnormal space. In addition, the models 420 may comprise high-fidelity models that can be used to create a data set (e.g., a set that describes abnormal space as "levels of threat conditions in the system versus quantities from the monitoring nodes"). The data 430 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the abnormal nodes"). This process will result in data sets for "abnormal space" and "normal space."

The 60 to 80 seconds long quantities may be used to compute features 440 using feature engineering to create feature vectors. These feature vectors along with wind information can then be used to obtain a set of decision boundaries that separate the data sets for abnormal space and normal space (used to detect an anomaly such as a cyber-attack or fault).

Since faults or attacks might be multi-prong (e.g., multiple attacks might happen at once), DoE experiments may be designed to capture the abnormal space (e.g., using full factorial, Taguchi screening, central composite, and/or Box-Behnken). When models are not available, these DoE methods can also be used to collect data from real-world wind turbines. Experiments may run, for example, using different combinations of simultaneous attacks, faults, and/or wind conditions. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 5:
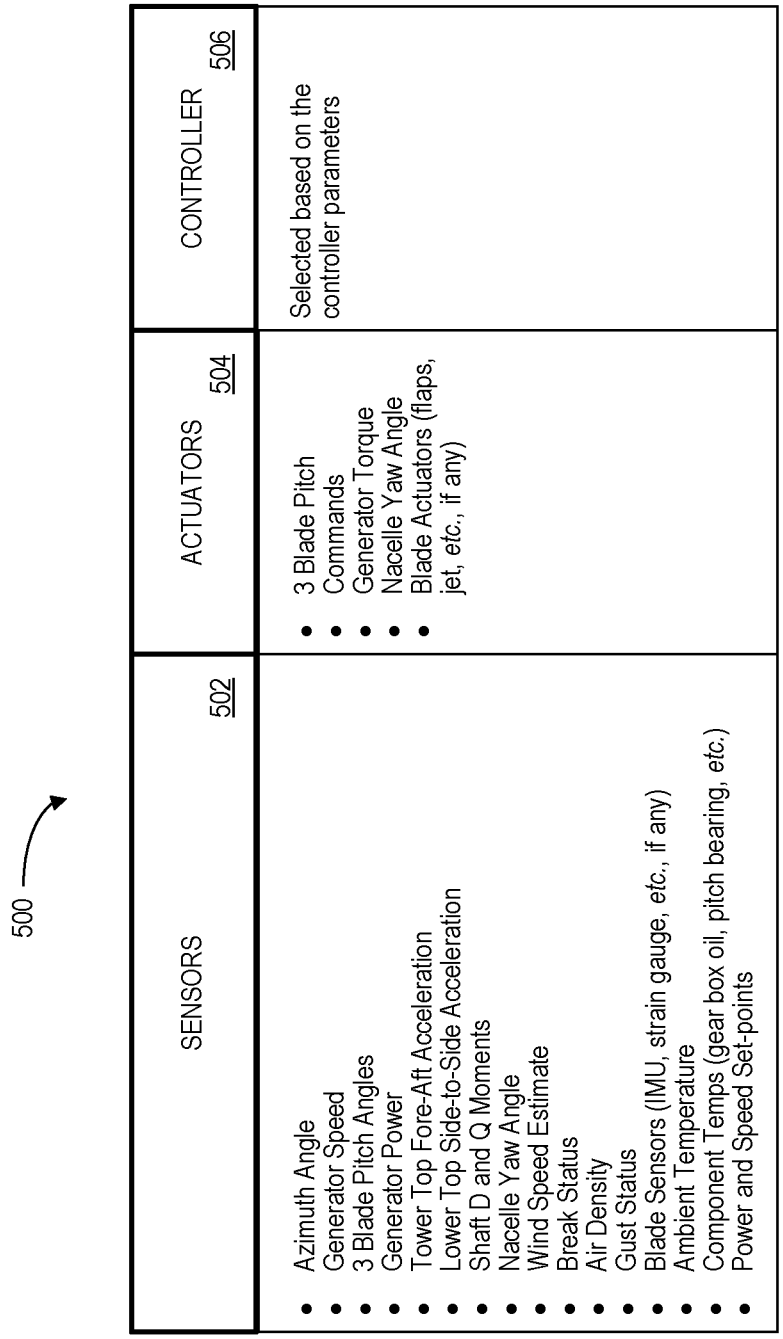
FIG. 5 illustrates an example set of monitoring nodes for a wind turbine according to some embodiments.

In addition to wind information, systems may analyze and/or monitor various types of wind turbine information. For example, FIG. 5 is an example set 500 of monitoring nodes for a wind turbine according to some embodiments. The set 500 might include sensors 502 that provide information about, for example, an azimuth angle, generator speed, blade pitch angles, generator power, etc. The set 500 may further include actuators 504 including commands, generator torque, yaw angles, etc. In addition, the set 500 may include controllers 506 that are selected base on controller parameters.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process, faults, and/or threats. According to some embodiments, dissimilar values from monitoring nodes may be normalized to unit-less space, which may allow for a simple way to compare outputs and strength of outputs.

Figure 6:
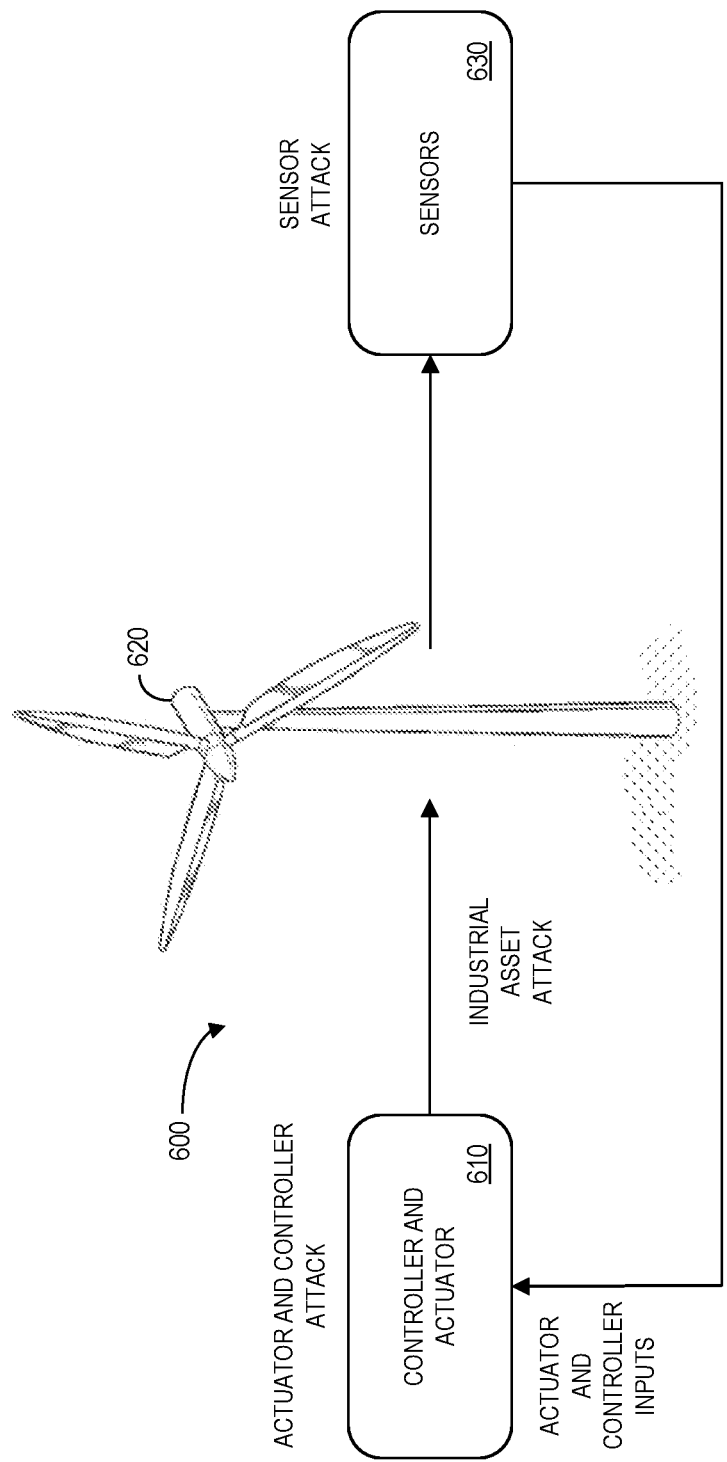
FIG. 6 is an example associated with a wind turbine engine in accordance with some embodiments.

FIG. 6 is an example 600 associated with a wind turbine in accordance with some embodiments. In particular, the example includes a controller and actuator portion 610 subject to actuator and controller attacks, a wind turbine portion 620 subject to state attacks, and sensors 930 subject to sensor attacks. By way of examples only, the sensors 630 might comprise physical and/or virtual sensors associated with wind speed, temperatures, blade parameters, power levels, etc. The actuators might be associated with, for example, generators. By monitoring the information in the wind turbine 620, an anomaly detection platform may be able to detect faults and/or cyber-attacks (e.g., using feature vectors and a decision boundary) that could potentially cause a large amount of damage.

Figure 7:
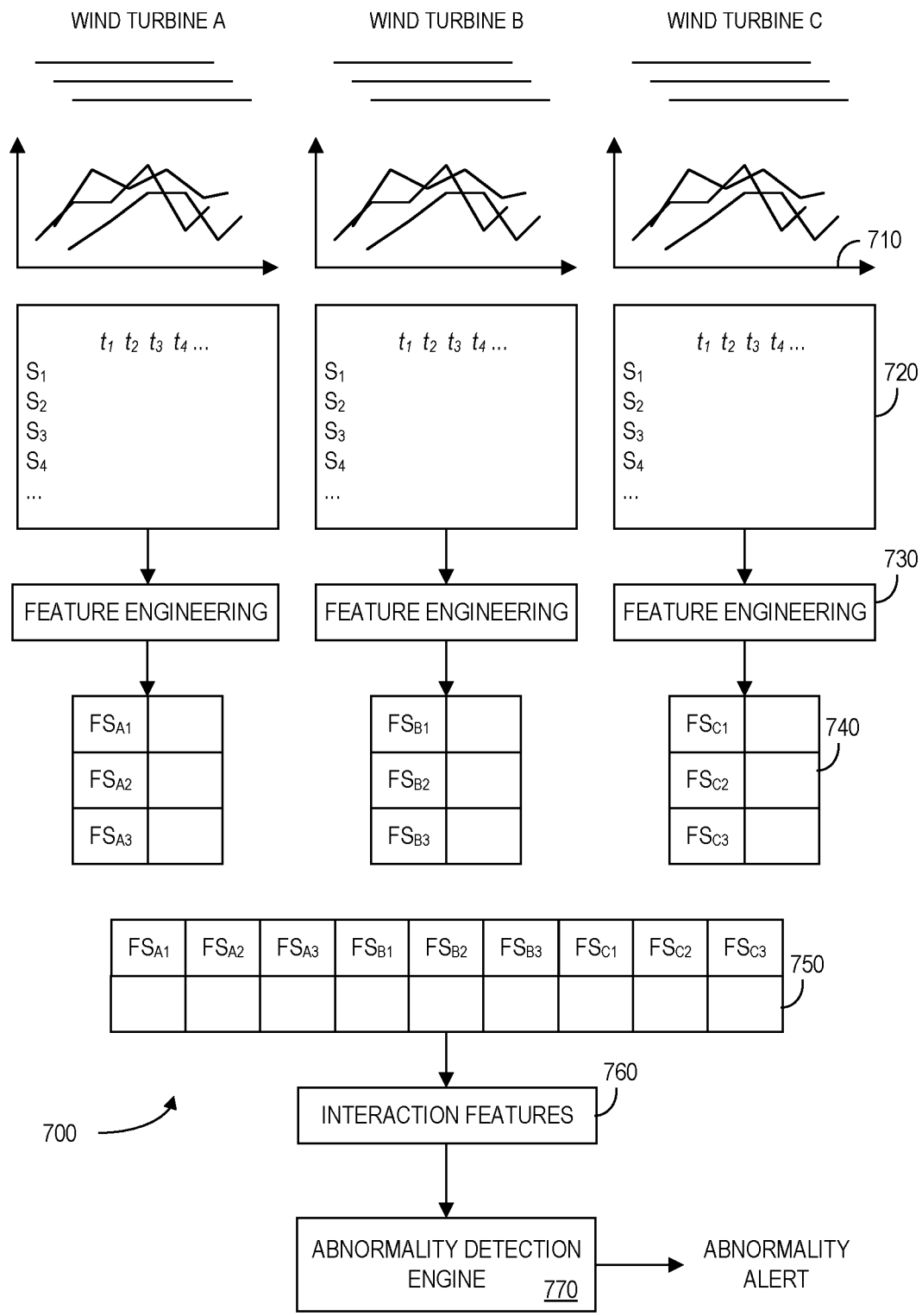
FIG. 7 is an example of a global threat protection system in accordance with some embodiments when multiple wind turbines (or monitoring nodes) are involved in a system.

FIG. 7 is an example of a global wind turbine protection system 700 in accordance with some embodiments when multiple wind turbines are involved in a system. In particular, the system 700 includes three wind turbines (A, B, and C) and batches of values 710 from monitoring nodes are collected for each generated over a period of time (e.g., 60 to 80 seconds). According to some embodiments, the batches of values 710 from monitoring nodes overlap in time. The values 710 from monitoring nodes may, for example, be stored in a matrix 720 arranged by time ($t_1$, $t_2$, etc.) and by type of monitoring node ($S_1$, $S_5$, etc.). Feature engineering components 730 may use information in each matrix 720 to create a feature vector 740 for each of the three wind turbines (e.g., the feature vector 740 for wind turbine C might include $FS_{C1}$, $FS_{C2}$, etc.). The three feature vectors 740 may then be combined into a single global feature vector 750 for the system 700. Interaction features 760 may be applied (e.g., associated with A*B*C, A+B+C, etc.) and an abnormality detection engine 770 may compare the result with a decision boundary (selected based on wind conditions) and output an abnormality alert signal when appropriate.

Figure 8:
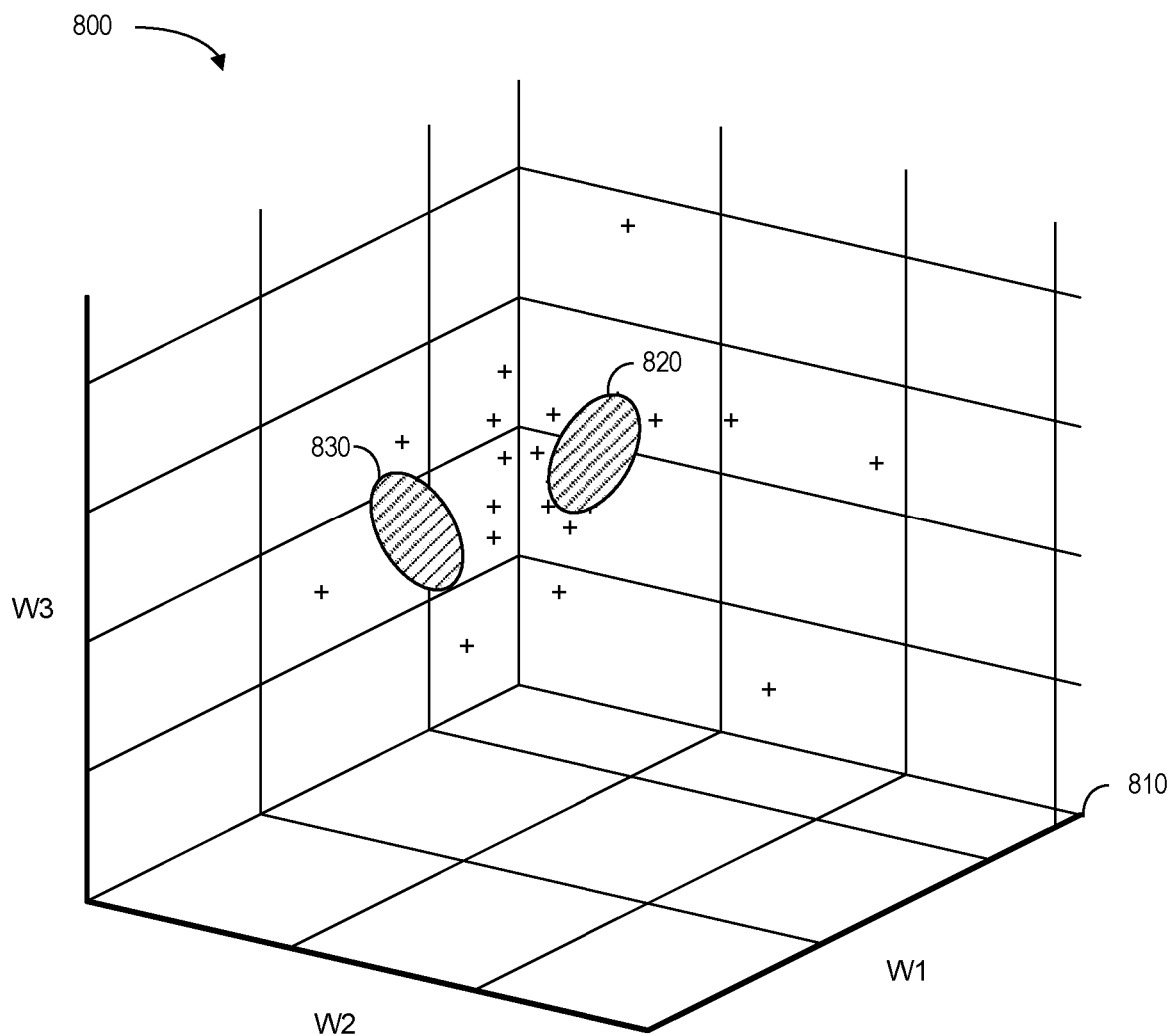
FIG. 8 illustrates three dimensions of wind turbine sensor outputs in accordance with some embodiments.

FIG. 8 illustrates 800 three dimensions of wind turbine monitoring node outputs in accordance with some embodiments. In particular, a graph 810 plots monitoring node outputs ("+") in three dimensions, such as dimensions associated with Principal Component Features ("PCF"): w1, w2, and w3. Moreover, the graph 810 includes an indication of a first normal operating space decision boundary 820 associated with a first wind condition. Although a single contiguous boundary 820 is illustrated in FIG. 8, embodiments might be associated with multiple regions. For example, the graph 810 includes an indication of a second normal operating space decision boundary 830 associated with a second wind condition. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_i \Psi_j$$

where $S_0$ is the average threat node output with all threats, $w_j$ is the $j^{th}$ weight, and $\Psi_j$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \Psi_j,$$

Note that weights may be an example of features used in a feature vector.

Thus, embodiments may enable the passive detection of indications of wind turbine abnormal operations using real-time signals from monitoring nodes. Moreover, the detection framework may allow for the development of tools that facilitate proliferation of the invention to various systems (e.g., different turbine models) in multiple geolocations. According to some embodiments, distributed detection systems enabled by this technology (across multiple types of equipment and systems) will allow for the collection of coordinated data to help detect faults and multi-prong attacks. Note that the feature-based approaches described herein may allow for extended feature vectors and/or incorporate new features into existing vectors as new earnings and alternate sources of data become available. As a result, embodiments may detect a relatively wide range of faults and/or cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to wind turbine operators so that an attack may be thwarted (or the effects of the attack may be blunted), reducing damage to equipment.

According to some embodiments, a system may further localize an origin of an abnormal condition to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in an abnormality alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple faults or attacks on control signals, and rationalize where the root cause fault or attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 9:
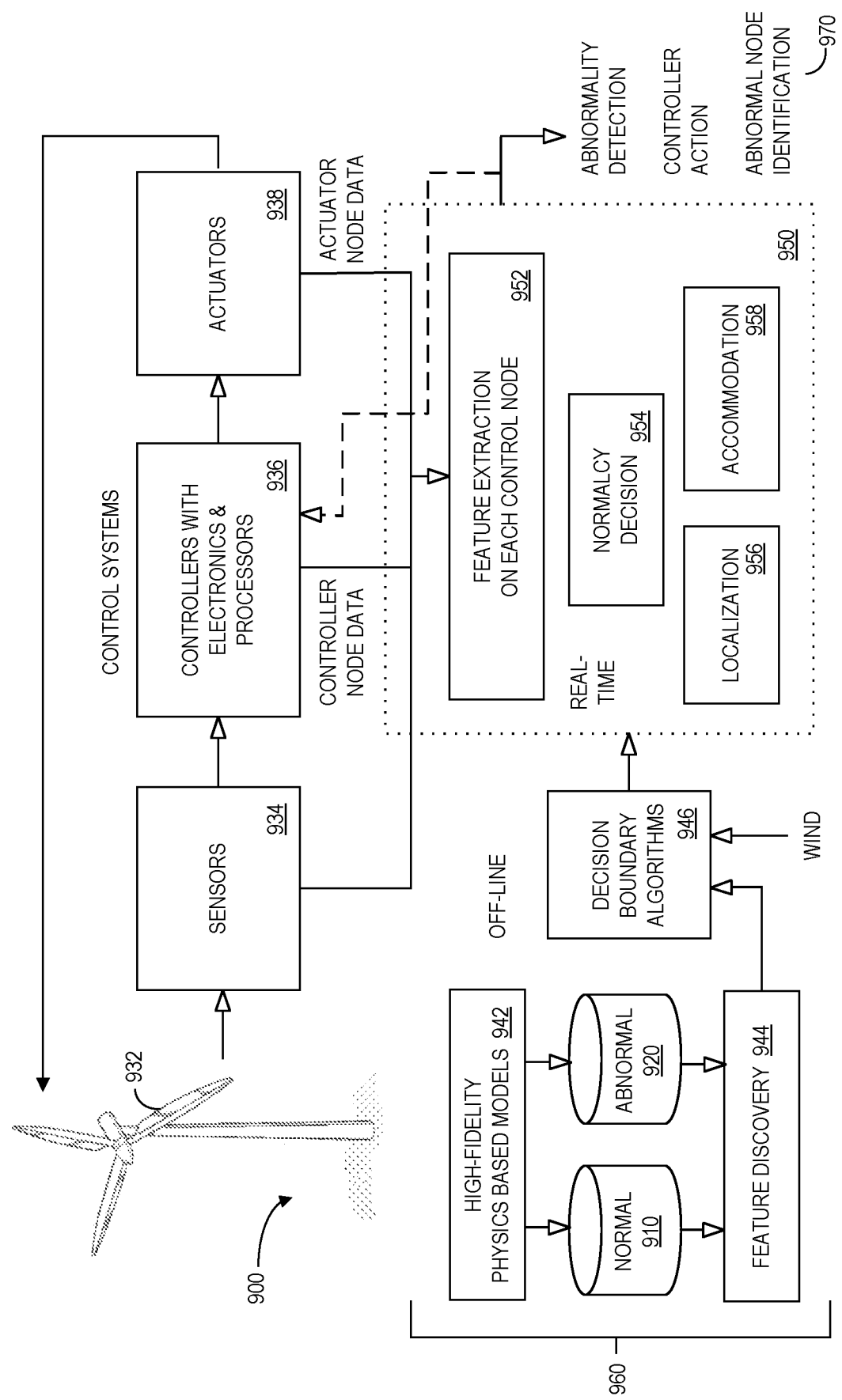
FIG. 9 is a wind turbine abnormality alert system according to some embodiments.

A cyber-attack detection and localization algorithm may process a real-time wind turbine signal data stream and then compute features (multiple identifiers) which can then be compared to the signal-specific decision boundary. A block diagram of a system 900 utilizing a signal-specific wind turbine abnormality detection and localization algorithm according to some embodiments is provided in FIG. 9. In particular, a wind turbine 932 provides information to sensors 934 which helps controllers with electronics and processors 936 adjust actuators 938. An abnormality detection system 960 may include one or more high-fidelity physics based models 942 associated with the wind turbine 932 to create normal data 910 and/or abnormal data 920. The normal data 910 and abnormal data 920 may be accessed by a feature discovery component 944 and processed by decision boundary algorithms 946 along with associated wind information while off-line (e.g., not necessarily while the wind turbine 932 is operating). The decision boundary algorithms 946 may generate an abnormality detection model including decision boundaries for various monitoring nodes and/or wind conditions. Each decision boundary may separate two data sets in a high dimensional space which is constructed by running a binary classification algorithm, such as a support vector machine using the normal data 910 and abnormal data 920 for each monitoring node signal (e.g., from the sensors 934, controllers 936, and/or the actuators 938).

A real-time threat detection platform 950 may receive the boundaries along with streams of data from the monitoring nodes (e.g., including current wind information). The platform 950 may include a feature extraction on each monitoring node element 952 and a normalcy decision 954 with an algorithm to detect attacks and faults in individual signals using signal specific decision boundaries (selected based on current wind conditions), as well rationalize faults and attacks on multiple signals, to declare which signals are being attacked, and which became anomalous due to a previous fault or attack on the system via a localization module 956. An accommodation element 958 may generate outputs 970, such as an abnormality decision indication (e.g., a fault or threat alert signal), a controller action, and/or a list of abnormal monitoring nodes.

During real-time detection, contiguous batches of control signal data may be processed by the platform 950, normalized and the feature vector extracted. The location of the vector for each signal in high-dimensional feature space may then be compared to a corresponding decision boundary selected based on wind conditions. If it falls within the abnormal region, then abnormal operation may be declared. The algorithm may then make a decision about where the abnormality originally occurred. An abnormality may sometimes be an attack on the actuators 938 and then manifested in the sensor 934 data. Abnormality assessments might be performed in a post decision module (e.g., the localization element 956) to isolate whether the abnormality is related to the sensor, controller, or actuator (e.g., indicating which part of the monitoring node). This may be done by individually monitoring, over time, the location of the feature vector with respect to the hard decision boundary. For example, when a sensor 934 is spoofed, the attacked sensor feature vector will cross the hard decision boundary earlier than the rest of the vectors as described with respect to FIGS. 10 through 12. If a sensor 934 is declared to be anomalous, and a command to the auxiliary equipment is later determined to be anomalous, it may be determined that the original attack, such as signal spoofing, occurred on the sensor 934. Conversely, if the signal to the auxiliary equipment was determined to be anomalous first, and then later manifested in the sensor 934 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous, and an attack on a signal may then be identified.

Figure 10:
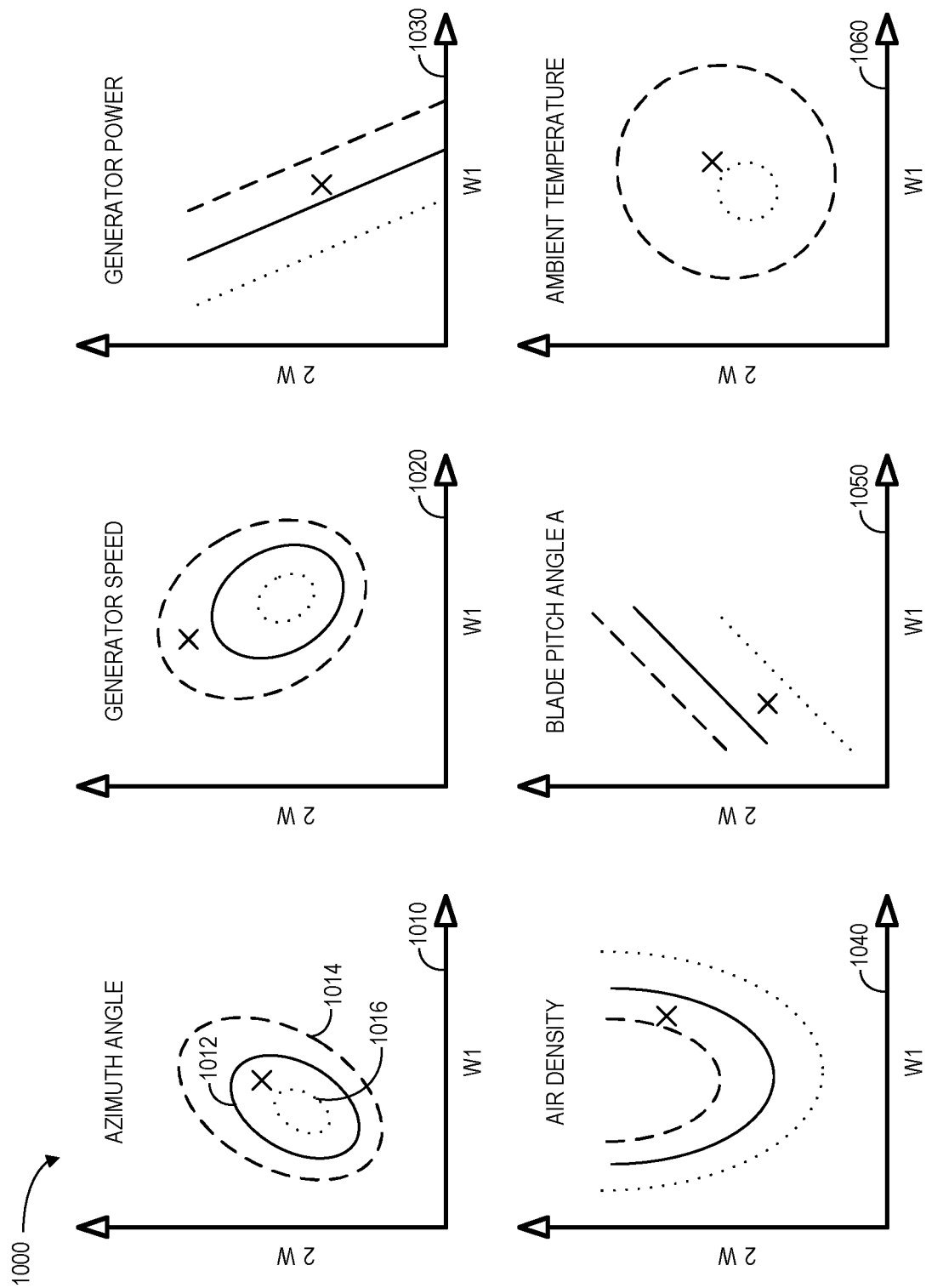
FIGS. 10 through 12 illustrate boundaries and locations of feature vectors for various wind turbine parameters in accordance with some embodiments.

FIG. 10 illustrates 1000 boundaries and feature vectors for various wind turbine monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for azimuth angle 1010, generator speed 1020, generator power 1030, air density 1040, blade pitch angle A 1050, and ambient temperature 1060. Each graph includes a hard boundary 1012 (solid curve), minimum boundary 1016 (dotted curve), and maximum boundary 1014 (dashed curve) and an indication associated with current feature location for each wind turbine monitoring node parameter (illustrated with an "X" on the graph). As illustrated in FIG. 10, the current monitoring node location is between the minimum and maximum boundaries (that is, the "X" is between the dotted and dashed lines). As a result, the system may determine that the operation of the wind turbine control system is normal (and no fault or threat is being detected indicating that the system is currently under attack).

Figure 11:
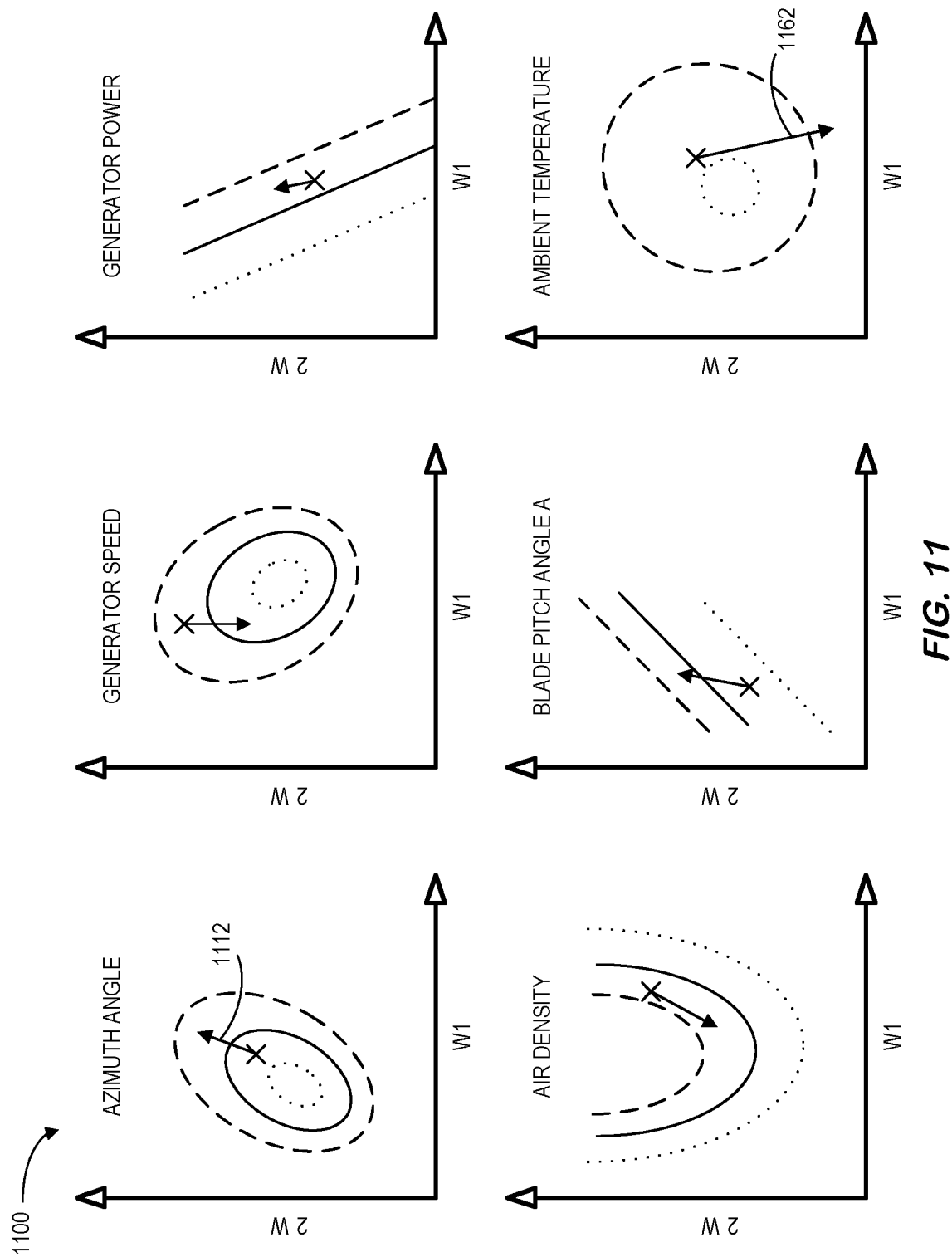

FIG. 11 illustrates 1100 subsequent boundaries and feature vectors for these parameters. Consider, for example, a feature vector movement 1112 for the azimuth angle. Even though feature vector 1112 has moved, it is still within the maximum and minimum boundaries and, as a result, normal operation of that monitoring node may be determined. This is the case for the first five graphs in FIG. 11. In this example, a feature vector movement 1162 for the wind turbine ambient temperature has exceeded with maximum boundary and, as a result, abnormal operation of that monitoring node may be determined. For example, a fault or threat may exist for the ambient temperature scale factor, which is a corrective value. The result is that the feature for the intermediary monitoring node signal feature vector illustrated in FIG. 11 moves 1162 such that it is anomalous. The algorithm detects this fault or cyber-attack, and two parallel actions might be initiated. One action may be post processing of the signal to discover what was attacked, in this case if the system has been monitoring each temperature sensor, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 11, assume that the ambient temperature signal was attacked. This may cause the system to respond in such a way so as to put other signals into an abnormal state. This is illustrated 1200 in FIG. 12, where the attack has already been detected and now other signals shown to be abnormal. In particular, feature movement for the azimuth angle 1212, generator speed 1222, generator power 1232, and air density 1242 have all become abnormal (joining the feature vector for the wind turbine ambient temperature 1262). Note that the feature vector for blade pitch angle A did not become abnormal. In order to decide whether or not these signals 1212, 1222, 1232, 1242 are truly currently under attack, a historical batch with pertinent feature vector information may be kept for some duration of time. Then when an attack is detected on another signal, this batch is examined, and the time at which the confirmed attack on wind turbine ambient temperature as well as several subsequent elements is analyzed.

Note that one signal rationalization might be associated with a system time delay. That is, after a wind turbine sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of wind turbine sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, blade angles, etc.). Full factorial, Taguchi screening, central composite and Box-Behnken are some of the known design methodologies used to create the attack space. When models are not available, these DoE methods are also used to collect data from real-world wind turbines. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 12:
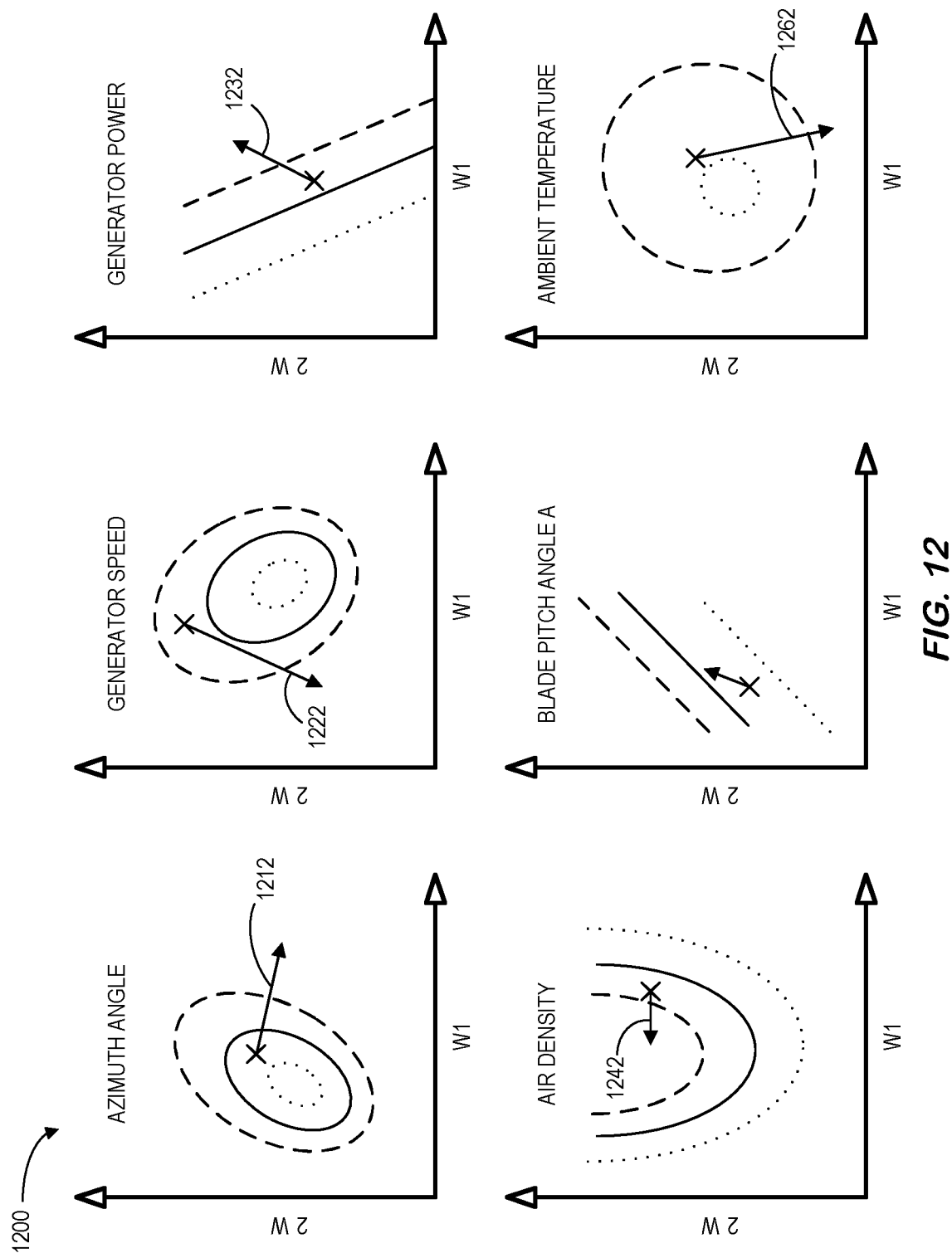

Note that multiple vector properties might be examined, and the information described with respect to FIGS. 10 through 12 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular wind turbine monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a wind turbine by learning a priori from tuned high-fidelity equipment models and/or actual "on the job" data to detect single or multiple simultaneous adversarial threats to the wind turbine. Moreover, according to some embodiments, all monitoring node data may be converted to features using advanced feature-based methods, and the real-time operation of the wind turbine may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the wind turbine to normal operation in a timely fashion.

Thus, some embodiments may provide an advanced anomaly detection algorithm to detect faults and cyber-attacks on, for example, key wind turbine control sensors. The algorithm may identify which signals(s) are being attacked using control signal-specific decision boundaries and may inform a wind turbine to take accommodative actions. In particular, a detection and localization algorithm might detect whether a sensor, auxiliary equipment input signal, control intermediary parameter, or control logical are in a normal or anomalous state. Some examples of wind turbine monitoring nodes that might be analyzed include: critical control sensors; control system intermediary parameters; auxiliary equipment input signals; and/or logical commands to controller.

A cyber-attack detection and localization algorithm may process a real-time wind turbine signal data stream and then compute features (multiple identifiers) which can then be compared to the sensor specific decision boundary. In some embodiments, generating features may involve simply performing an identity transform. That is, the original signal might be used as it is.

Figure 13:
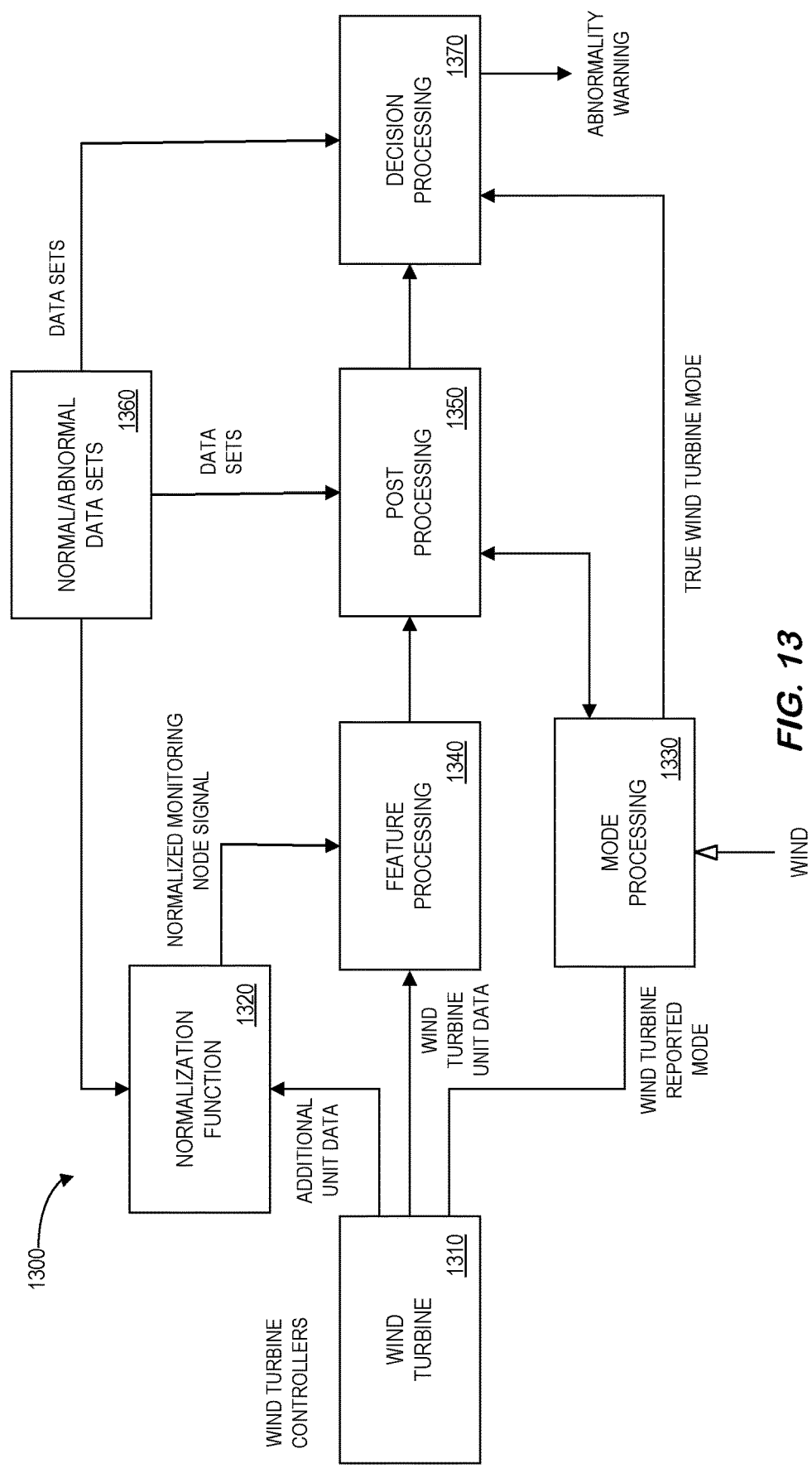
FIG. 13 illustrates a block diagram view of a wind turbine abnormality detection system in accordance with some embodiments.

Note that a wind turbine may be associated with non-linear operations over a range of operating parameters. As a result, data variations can be substantial and determining when a fault or cyber threat is present based on operation of the control system may be difficult. FIG. 13 illustrates a block diagram view of an abnormality detection system 1300 in accordance with some embodiments. In particular, the system 1300 illustrates a wind turbine 1310 (e.g., associated with unit controllers) that transmits information about temperature, airflow, etc. to a normalization function 1320. The wind turbine 1310 may also transmit information to mode processing 1330 (e.g., a reported mode of operation and current wind information) and feature processing 1340 (e.g., unit data). The normalization function 1320 might, for example, transmit a normalized monitoring node signal to feature processing 1340. Post processing 1350 may receive information from feature processing 1340 and transmit data to decision processing 1370 (which can automatically create a fault or cyber-attack warning based at least in part on data sets received from a normal/attack data sets storage unit 1360).

Figure 14:
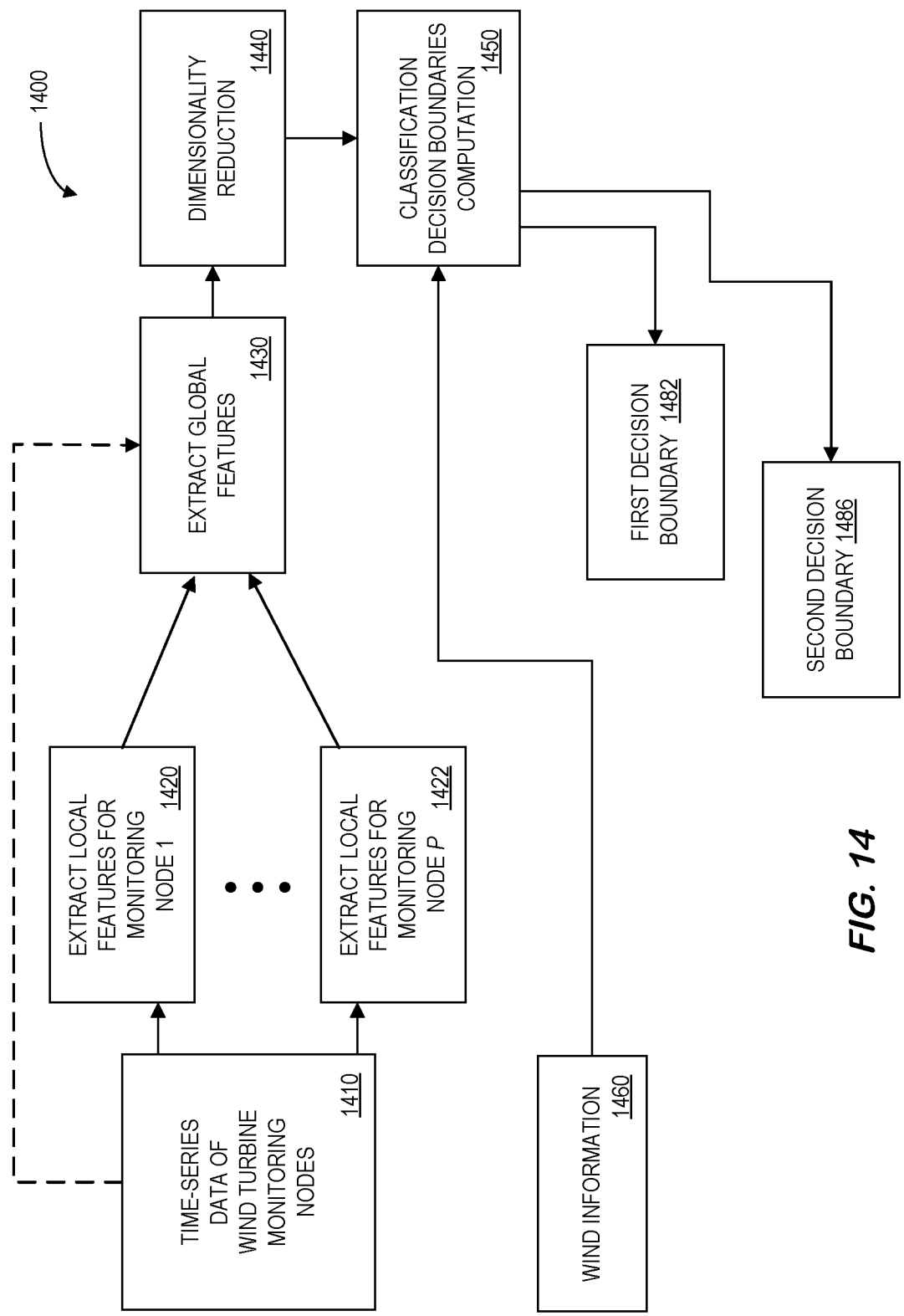
FIG. 14 is a high-level block diagram of an off-line training process to protect a wind turbine according to some embodiments.

In this way, embodiments may provide a method and system for anomaly (a cyber-attack or a fault) detection in wind turbine that is fast and reliable at a physical layer using a plurality of monitoring nodes. The system may provide coverage for substantially all of the wind turbine operating space in both below-rated and above-rated regions as well as during gust events and/or power curtailments as will now be described. FIG. 14 is a high-level block diagram of an "off-line" training process 1400 (e.g., that might be executed before a wind turbine is operating) to protect a wind turbine according to some embodiments. After time-series of wind turbine values 1410 are received from monitoring nodes (e.g., based on a physics model or historical data), local features may be extracted for each node 1420, 1422 (for a total of P nodes). Global features may also be extracted 1430 and a dimensionality reduction process 1440 may be executed. Note that global features may include interactive features that involve two or more monitoring nodes. Also note that the global feature extraction 1430 might also utilize information directly from the time-series data 1410 (as illustrated by the dashed arrow of FIG. 14). A classification and decision boundaries computation 1450 may then be performed using wind information 1460 to create a first decision boundary 1482 (e.g., associated with a first wind condition) and a second decision boundary 1486 (e.g., associated with a second wind condition).

Figure 15:
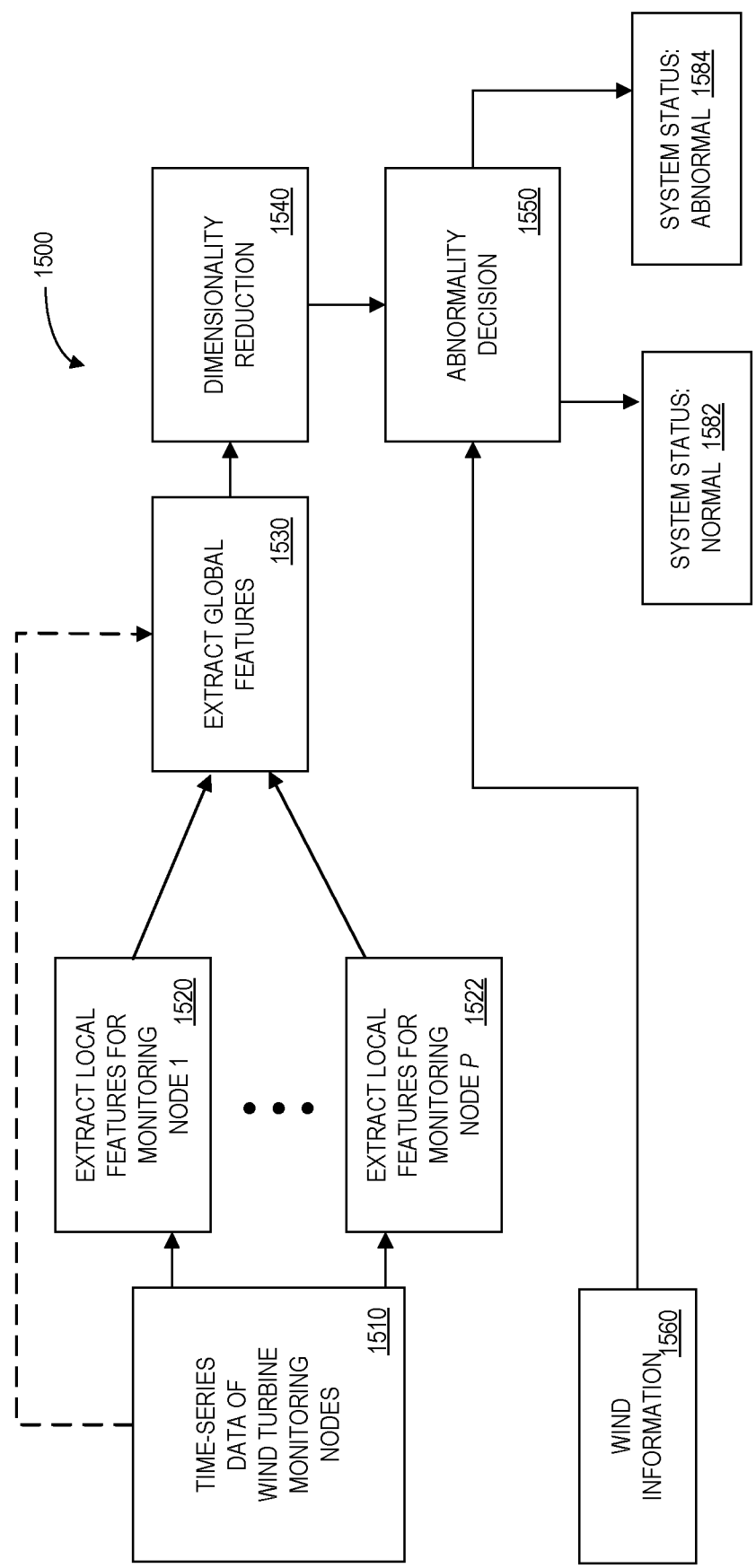
FIG. 15 is a is a high-level block diagram of an on-line operation process to protect a wind turbine in accordance with some embodiments.

FIG. 15 is a is a high-level block diagram of an "on-line" operation process 1500 (e.g., that might be executed while a wind turbine is generating power) to protect a wind turbine in accordance with some embodiments. After time-series of current wind turbine values 1510 are received from monitoring nodes, local features may be extracted for each node 1520, 1522 (for a total of P nodes). Global features may also be extracted 1530 and a dimensionality reduction process 1540 may be executed. Note that the global feature extraction 1530 might also utilize information directly from the time-series data 1510 (as illustrated by the dashed arrow of FIG. 15). An abnormality decision 1550 may then be performed using wind information 1560 to select an appropriate decision boundary and an output may indicate if the system status is normal 1582 or abnormal 1584 (e.g., currently being cyber-attacked or experiencing a fault).

Figure 16:
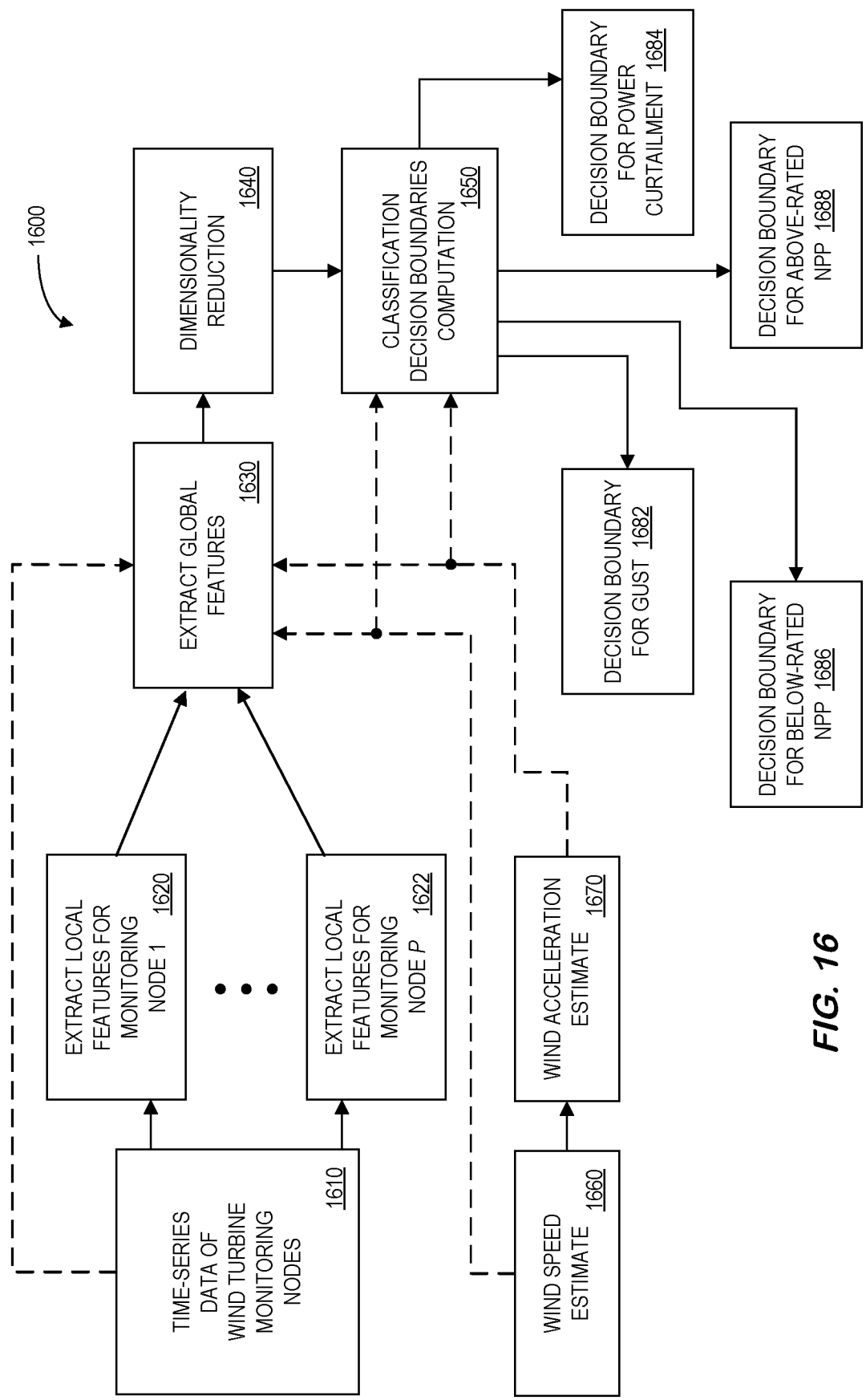
FIG. 16 is a block diagram of a more detailed off-line training process to protect a wind turbine according to some embodiments.

FIG. 16 is a block diagram of a more detailed off-line training process 1600 to protect a wind turbine according to some embodiments. Embodiments may receive time-series data from a collection of monitoring nodes 1610 (sensor/actuators/controller nodes) and extracts feature from the time-series data for each monitoring node 1620, 1622. The term "feature" may refer to, for example, mathematical characterizations of data. Examples of features as applied to data might include the statistical features, such as maximum and minimum, mean, standard deviation, variance, or higher-order statistics, rise time, settling time, Fast Fourier Transform ("FFT") spectral components, linear and non-linear principal components, independent components, sparse coding, deep learning, etc. The structural natural frequencies of the wind turbine can also be considered as features. This may include, for example, tower natural frequencies (e.g., 1st and 2nd harmonic frequencies of the tower fore-aft and side-to-side vibrations) and blade natural frequencies (e.g., 1st and 2nd harmonic frequencies of the blade flap-wise, edgewise, and/or torsional vibrations). The natural frequencies may be computed through spectral analysis methods such as FFT or a Eigensystem Realization Algorithm ("ERA"). The type and number of features for each monitoring node might be optimized using domain-knowledge, feature engineering, or Receiver Operator Curve ("ROC") statistics. The local features for each monitoring node may be, according to some embodiments, stacked to create a global feature vector 1630. The global feature vector may also contain interactive feature involving two or more monitoring nodes, e.g. cross-correlation between two nodes as illustrated by the dashed arrow in FIG. 16. The interactive features may be selected through correlation analysis between the nodes. The rate of change of the time-domain signals or the rate of change of the features may also be used as additional features. The features may be normalized using some base values such as those in at-rated wind speed (the wind speed at which wind turbine reaches its rated power) condition. The dimension of the global feature vector can then be further reduced 1640 using any dimensionality reduction technique such as PCA. The features may be, for example, calculated over a sliding window of the signal time series. The length of the window and the duration of slide may be determined from domain knowledge and inspection of the data or using batch processing.

During a training phase, normal, attack, and fault data sets may be generated and their corresponding features may be extracted. The normal data may be collected during different operational modes of the asset and different ambient conditions. The training data may include node time-series during different wind speeds covering the above-rated and below-rated with different turbulence intensity levels, and different horizontal and vertical wind shear factors, as well as different wind directions, ambient temperatures and air densities. The training data may also include gust scenarios, such as 1-year and 50-year Extreme Operating Gust ("EOG"), Extreme Coherent Gust ("ECG"), and/or Extreme gust with Change of Direction ("ECD") occurring at different wind speeds as described in the International Electrotechnical Commission ("IEC") 61400 standard. The attack data set may comprise different attack types of different severity injected to single or multiple monitoring nodes, and the fault data set may consist of data associated with different failure modes of each monitoring node. Note that single or multiple node anomalies may be simulated for each training or evaluation case. A DoE may be used to optimize the number of simulation runs and accommodate multiple variation factors. The data sets may be generated, for example, using physics-based or data-driven models and/or collected from the field.

According to some embodiments, a wind turbine control system may contain a wind speed estimate 1660 either as a physical sensor (such as an anemometer or LIDAR) or a virtual sensor (such as a model-based observer). Note that most wind turbine control systems have such a wind speed estimator. The wind speed estimate 1660 and its derivative (i.e., wind acceleration estimate 1670) may also be used as part of the feature vector (as illustrated by dashed arrows in FIG. 16). Note that ROC statistics may be used at the global level to optimize a selected number of principal components.

According to some embodiments, the generated data sets may be used by a classification decision boundaries computation 1650 to compute four classification decision boundaries. A first decision boundary may be computed for above-rated Normal Power Production ("NPP") 1688. This boundary 1688 may be computed using normal and abnormal data during the above-rate wind speeds and normal power production (i.e., no gust events). The above-rated region may be defined as the wind speeds from the rated wind speed, i.e. the wind speed at which the wind turbine reaches its rated power (usually between 10-12 m/s based on the type of the turbine) to the cut-off wind speed (i.e., the maximum speed at which the turbine can still operate safely, usually, between 23-25 m/s, based on the type of the wind turbine).

A second decision boundary may be computed for below-rated normal power production 1686. This boundary 1686 may be computed using normal and abnormal data during the below-rate wind speeds and normal power production (i.e., no gust events). The below-rated region is from the cut-in wind speed or the minimum wind speed at which the wind turbine can produce power (usually 3-5 m/s based on the type of the wind turbine) to the rated wind speed.

A third decision boundary may be computed for gust wind conditions 1682. This boundary 1682 may be computed using normal and abnormal data during gust events with different types and intensities. The gust may happen at any speed of the full operational range of the turbine from cut-in to cut-off speeds. Note that a single boundary may be used for gust events occurring both at below-rated and above-rated regions, since a gust starting at below-rated speed may well span into the above-rated speeds as well.

A fourth decision boundary may be computed for power curtailment 1684. This boundary 1684 may be computed using normal and abnormal data during power curtailment. Note that within certain power grid connection agreements, the output of a wind turbine may be curtailed at certain times according to power grid scheduling and planning demand (which will result in a reduction of energy production). This factor may also include the time taken for the wind turbine to become fully operational following grid curtailment. In addition, in certain jurisdictions, there may be requirements to curtail wind turbines during specific meteorological conditions to meet defined noise emission or shadow flicker criteria at nearby dwellings. Since the curtailment may happen both during below-rated and above-rated conditions, similar to the gust decision boundary 1682, a single decision boundary may be used for power curtailment 1684 in both of those regions.

Thus, a system may use separate boundaries for gust, normal power production, and curtailment to increase accuracy and reduce false alarms associated with abnormality detection. The system may also use two separate boundaries for below-rated and above-rated conditions since the wind turbine control strategies may be substantially different in these two regions. While the below-rated control may use a constant blade pitch commands to optimize the power production, the above-rated control may use variable blade pitch commands to regulate the power and minimize structural loads. The binary classifiers can be trained using binary classification methods such as Support Vector Machines ("SVM"), an Extreme Learning Machine ("ELM") neural network, kernel-ELM (ELM with a nonlinear kernel, such as a Gaussian or wavelet kernel), decision trees, deep neural networks, etc. The computed classification decision boundaries may then be stored in the system to be used during real-time operation of the wind turbine.

Figure 17:
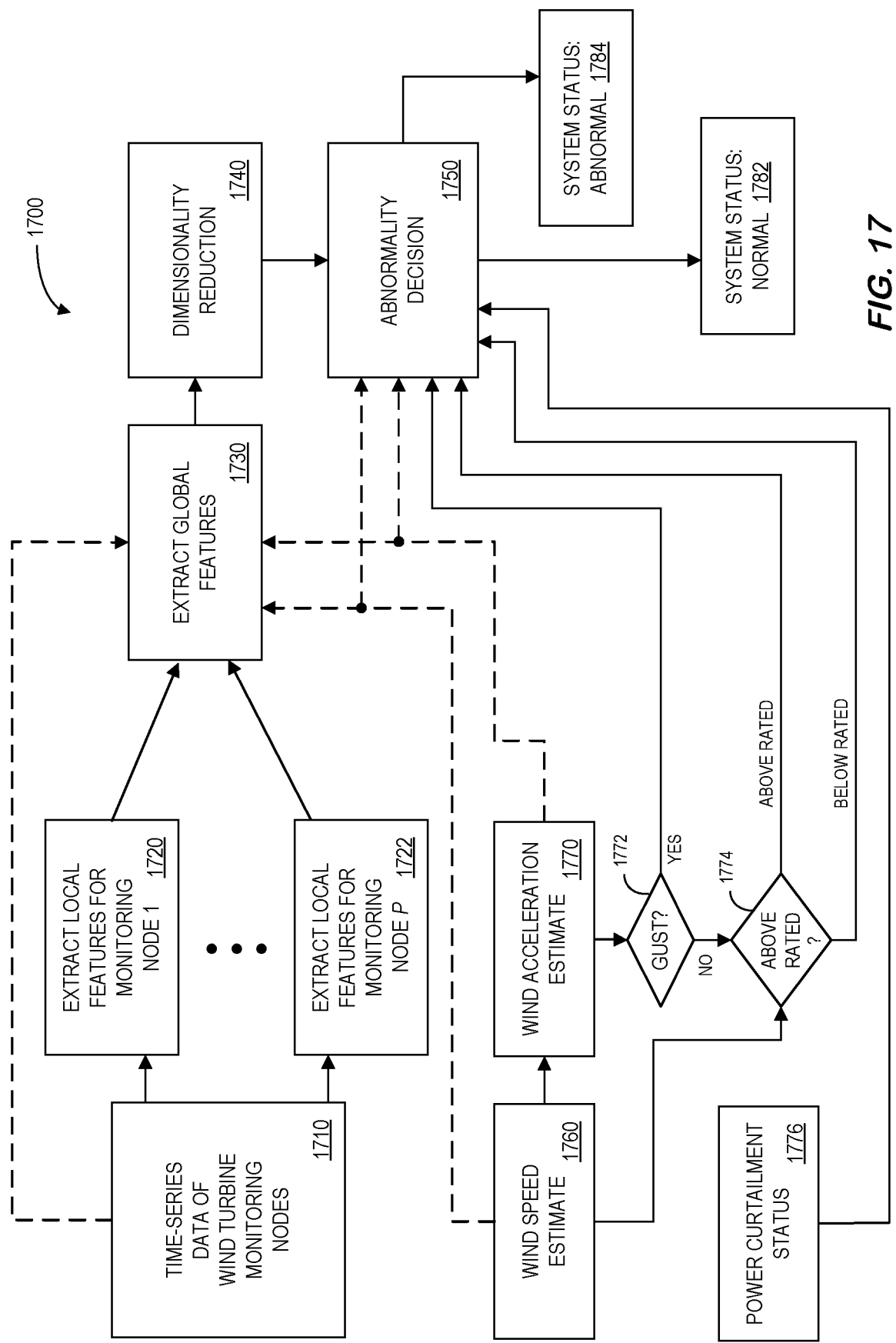
FIG. 17 is a is a block diagram of a more detailed on-line operation process to protect a wind turbine in accordance with some embodiments.

FIG. 17 is a is a block diagram of a more detailed on-line operation process 1700 to protect a wind turbine in accordance with some embodiments. As before, current time-series monitoring node data 1710 may be used to extract local features 1720, 1722 and global features 1730. Dimensionality reduction 1750 may then be performed and an abnormality decision 1750 may be generated. A wind speed estimate 1760 and/or wind speed acceleration estimate 1770 may be used to determine if a gust condition currently exists 1772, such as by applying a threshold comparison to the wind acceleration estimate 1770 (and, if so, that decision boundary may be selected). If the wind turbine control system contains a gust detector, the output of that detector may be used instead. The wind speed estimate 1772 may also be used to determine if the wind turbine is in below-rated or above-rated mode 1774. This information is sent to the decision boundary selector 1750, which selects the appropriate boundary to be used for the anomaly decision. The decision boundary selector 1750 may also receive a status of power curtailment 1776 from the wind turbine control system. When the appropriate boundary is selected, the (dimensionality-reduced) global feature vector might be compared with that boundary which results in the global system status as being normal 1782 or abnormal 1784. The system status might be, for example, communicated to an operator or may be sent to automatically trigger some fault-tolerant or attack-tolerant control remedies.

Thus, embodiments may provide substantially rapid, robust, and accurate solution for anomaly detection is wind turbines even though wind may be both highly transient and hard to predict. Moreover, fast and reliable anomaly detection for wind turbines may be provided such that accurate turbine status is available both during natural faults (and hence performing as a fault detector) and cyber-attacks. This may increase wind turbine reliability and availability, provide status monitoring capability and anomaly analytics, etc.

By way of example, embodiments might be associated with a wind turbine in a high-fidelity simulation environment. The system might have 16 monitoring nodes (12 sensor nodes and 4 actuator nodes). A normal data set may be generated by simulating the wind turbine in a closed loop control system during various operation conditions using factors, such as wind speed, turbulence intensity level, wind direction, vertical and horizontal shear factors, etc.

A normal data set might include 100,000 data points (each data point containing the values of all 16 monitoring nodes) in the time space. By way of example only, 5 statistical features may be selected for each monitoring node. The features may be computed, according to some embodiments, over a 25 second sliding window. This will result in 4,000 normal events in the feature space. The global feature vector might be the original of size 80 which is then reduced to 25 using PCA analysis.

An abnormal training data set may be generated by simulating the wind turbine in a closed loop control system during various operation conditions, using the same operational variation factors as described above. An attack vector may be selected to be the critical sensors and actuators, such as three sensors (rotor speed, power, tower top fore-aft acceleration) and three actuators (pitch commands). The simulated attacks may be injected into the wind turbine using Pseudo-Random Binary Sequence ("PRBS") bias attacks on the attack vector. Note that this might be associated with a multi-prong attack simulation. The magnitude of each attack may be selected as a percentage of the current value of the corresponding node. The abnormal data set may consist of 15,000 data points (each data point containing the values of all 16 monitoring nodes) in the time space, which results in 600 abnormal events in the feature space.

Figure 18:
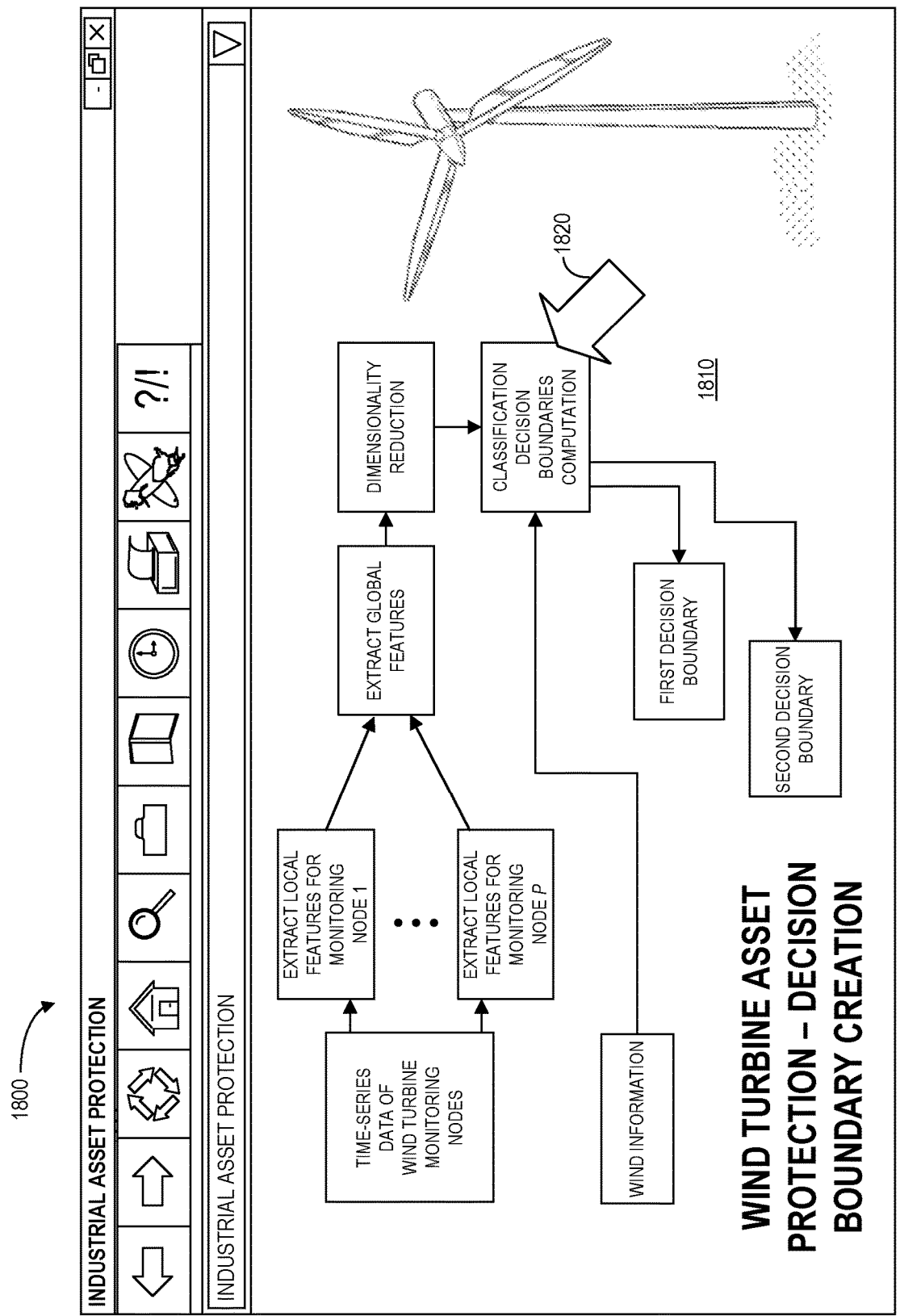
FIG. 18 is a wind turbine asset protection boundary decision creation display in accordance with some embodiments.

A classification decision boundary may then be trained for using kernel-ELM with Gaussian kernel. FIG. 18 is an example of a wind turbine protection display 1800 that might be used, for example, to provide a graphical depiction 1810 to an operator and/or to provide an interactive interface allowing an operator to adjust system components as appropriate. Selection of an item on the display 1800 (e.g., via a touchscreen or computer mouse pointer 1820) may let the operator see more information about that particular item and/or adjust operation of that item (e.g., by altering how global features are extracted).

Figure 19:
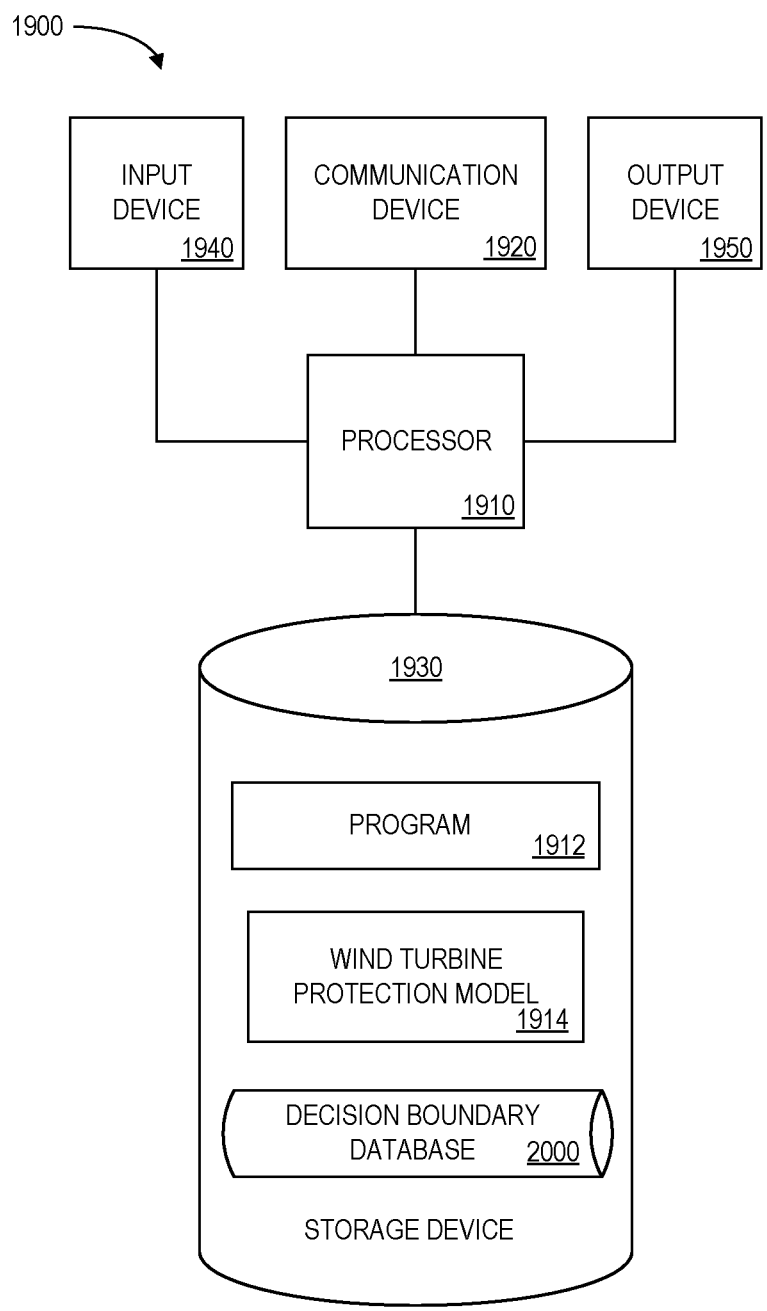
FIG. 19 is a wind turbine model apparatus according to some embodiments.

Note that the embodiments described herein may be implemented using any number of different hardware configurations. For example, FIG. 19 is a block diagram of a wind turbine protection platform 1900 that may be, for example, associated with the system 100 of FIG. 1 and/or any other system described herein. The wind turbine protection platform 1900 comprises a processor 1910, such as one or more commercially available Central Processing Units ("CPUs") in the form of one-chip microprocessors, coupled to a communication device 1920 configured to communicate via a communication network (not shown in FIG. 19). The communication device 1960 may be used to communicate, for example, with one or more remote monitoring nodes, user platforms, digital twins, etc. The wind turbine protection platform 1900 further includes an input device 1940 (e.g., a computer mouse and/or keyboard to input wind turbine and/or predictive modeling information) and/an output device 1950 (e.g., a computer monitor to render a display, provide alerts, transmit recommendations, and/or create reports). According to some embodiments, a mobile device, monitoring physical system, and/or PC may be used to exchange information with the wind turbine protection platform 1900.

The processor 1910 also communicates with a storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 stores a program 1912 and/or wind turbine protection model 1914 for controlling the processor 1910. The processor 1910 performs instructions of the programs 1912, 1914, and thereby operates in accordance with any of the embodiments described herein. For example, the processor 1910 may receive a series of current monitoring node values and generate a set of current feature vectors. The processor 1910 may also access an abnormality detection model having a plurality of decision boundaries created using wind information (e.g., wind speed and/or acceleration) along with at least one of a set of normal feature vectors and a set of abnormal feature vectors. The processor 1910 may then select one of the decision boundaries based on current wind information associated with the wind turbine and execute the abnormality detection model and transmit an abnormality alert signal based on the set of current feature vectors and the selected decision boundary The programs 1912, 1914 may be stored in a compressed, uncompiled and/or encrypted format. The programs 1912, 1914 may furthermore include other program elements, such as an operating system, clipboard application, a database management system, and/or device drivers used by the processor 1910 to interface with peripheral devices.

As used herein, information may be "received" by or "transmitted" to, for example: (i) the wind turbine protection platform 1900 from another device; or (ii) a software application or module within the wind turbine protection platform 1900 from another software application, module, or any other source.

In some embodiments (such as the one shown in FIG. 19), the storage device 1930 further stores a decision boundary database 2000. An example of a database that may be used in connection with the wind turbine protection platform 1900 will now be described in detail with respect to FIG. 21. Note that the database described herein is only one example, and additional and/or different information may be stored therein. Moreover, various databases might be split or combined in accordance with any of the embodiments described herein.

Figure 20:
FIG. 20 is portion of a tabular decision boundary database in accordance with some embodiments.

Referring to FIG. 20, a table is shown that represents the decision boundary database 2000 that may be stored at the wind turbine protection platform 1900 according to some embodiments. The table may include, for example, entries identifying decision boundaries associated with wind turbines to be protected. The table may also define fields 2002, 2004, 2006, 2008, 2010, 2012 for each of the entries. The fields 2002, 2004, 2006, 2008, 2010, 2012 may, according to some embodiments, specify: a decision boundary identifier 2002, a decision boundary description 2004, input requirements 2006, a boundary definition 2008, a currently active indication 2010, a status 2012, and a cause 2014. The decision boundary database 2000 may be created and updated, for example, off-line when a new physical system is monitored or modeled.

The decision boundary identifier 2002 and description 2004 may define a particular normal/abnormal boundary for a wind turbine that will be protected. The input requirements 2006 define when the boundary will be selected for use (e.g., based on current wind information). The boundary definition 2008 might comprise, for example, an equation separating normal space from abnormal space. The currently active indication 2010 might indicate if that particular decision boundary is currently being used to detect abnormal operation of the wind turbine. If it is currently being used, the status 2012 might indicate if the wind turbine is currently "normal" or "abnormal" and (in the case of abnormal operations), why the system is operating abnormally (e.g., due to a fault or a cyber-attack on one or more monitoring nodes).

FIG. 21 is one example of evaluation results 2100 for a wind turbine protection system in accordance with the simulation described with respect to FIGS. 18 through 21. As illustrated by the predicted class 2110 and the actual class 2120 of the wind turbine, all the abnormal events were detected (that is, there were 0% false negatives) while only 1.36% of the normal cases were misclassified as abnormal (that is, the was a 1.36% false positive rate).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on wind turbines, any of the embodiments described herein could be applied to other types of wind turbines including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect a wind turbine from a cyber attack at a physical domain level of the wind turbine, comprising:
a plurality of monitoring nodes each generating a series of current monitoring node values over time that represent a current operation of the wind turbine; and
an abnormality detection computer platform, coupled to the plurality of monitoring nodes, to:
receive the series of current monitoring node values and generate a set of current feature vectors,
access an abnormality detection model having a plurality of decision boundaries created using wind information along with at least one of a set of normal feature vectors and a set of abnormal feature vectors for each of the monitoring nodes, wherein the abnormal feature vectors are generated from abnormal monitoring node values over time that represent a cyber-attack on the wind turbine at the physical domain level of the monitoring nodes resulting in the abnormal monitoring node values,
for each of the monitoring nodes, select one of the decision boundaries based on current wind information associated with the wind turbine,
execute the abnormality detection model and transmit an abnormality alert signal based on the set of current feature vectors and the selected decision boundary, the alert signal generating an automatic response to a cyber-attack; and
wherein the abnormality detection model includes a below-rated normal power production decision boundary and an above-rated normal power production decision boundary, and said selection is based at least in part on a current wind speed and a threshold value associated with the wind turbine reaching its rated power.

2. The system of claim 1, wherein the wind information is associated with at least one: (i) a wind speed, and (ii) a wind acceleration.

3. The system of claim 1, wherein the abnormality detection model further includes a gust decision boundary.

4. The system of claim 3, wherein the gust decision boundary is associated with at least one of: (i) an extreme operating gust, (ii) an extreme coherent gust, and (iii) an extreme gust with change of direction.

5. The system of claim 3, wherein the abnormality detection model further includes a power curtailment decision boundary.

6. The system of claim 1, wherein at least one decision boundary is based on at least one global feature.

7. The system of claim 1, further comprising:
a normal space data source storing, for each of the plurality of monitoring nodes, a series of normal monitoring node values over time that represent normal operation of the wind turbine;
an abnormal space data source storing, for each of the plurality of monitoring nodes, the abnormal monitoring node values over time that represent a cyber-attack on the wind turbine; and
an abnormality detection model creation computer, coupled to the normal space data source the abnormal space data source, to:
(i) receive the series of normal monitoring node values and generate the set of normal feature vectors,
(ii) receive the series of abnormal monitoring node values and generate the set of abnormal feature vectors, and
(iii) automatically calculate and output the plurality of decision boundaries for the abnormality detection model based on wind information, the set of normal feature vectors, and the set of abnormal feature vectors.

8. The system of claim 7, wherein at least one of the series of normal monitoring node values and the series of abnormal monitoring node values are associated with a high-fidelity equipment model.

9. The system of claim 7, wherein the plurality of decision boundaries exists in a multi-dimensional space and are associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

10. A method to protect a wind turbine associated with a plurality of monitoring nodes from a cyber-attack at a physical domain level of the wind turbine, each monitoring node generating a series of current monitoring node values over time that represent a current operation of the wind turbine, comprising:
- receiving a series of current monitoring node values from a plurality of monitoring nodes each generating a series of current monitoring node values over time that represent a current operation of the wind turbine;
- generating a set of current feature vectors based on the series of current monitoring node values;
- accessing, by an abnormality detection computer platform, an abnormality detection model having a plurality of decision boundaries created using wind information along with at least one of a set of normal feature vectors and a set of abnormal feature vectors for each of the monitoring nodes, wherein the abnormal feature vectors are generated from abnormal monitoring node values over time that represent a cyber-attack on the wind turbine at the physical domain level of the monitoring nodes resulting in the abnormal monitoring node values;
- for each of the monitoring nodes, selecting one of the decision boundaries based on current wind information associated with the wind turbine;
- executing the abnormality detection model and transmitting an abnormality alert signal based on the set of current feature vectors and the selected decision boundary, the alert signal generating an automatic response to a cyber-attack; and
- wherein the abnormality detection model includes a below-rated normal power production decision boundary and an above-rated normal power production decision boundary, and said selection is based at least in part on a current wind speed and a threshold value associated with the wind turbine reaching its rated power.

11. The method of claim 10, wherein the wind information is associated with at least one: (i) a wind speed, and (ii) a wind acceleration.

12. The method of claim 10, wherein the abnormality detection model further includes a gust decision boundary.

13. The method of claim 12, wherein the abnormality detection model further includes a power curtailment decision boundary.

14. A non-transitory, computer-readable medium storing instructions that, when executed by a computer processor, cause the computer processor to perform a method to protect a wind turbine from a cyber-attack at a physical domain level of the wind turbine, the method comprising:
- receiving a series of current monitoring node values from a plurality of monitoring nodes each generating a series of current monitoring node values over time that represent a current operation of the wind turbine;
- generating a set of current feature vectors based on the series of current monitoring node values;
- accessing, by an abnormality detection computer platform, an abnormality detection model having a plurality of decision boundaries created using wind information along with at least one of a set of normal feature vectors and a set of abnormal feature vectors for each of the monitoring nodes, wherein the abnormal feature vectors are generated from abnormal monitoring node values over time that represent a cyber-attack on the wind turbine at the physical domain level of the monitoring nodes resulting in the abnormal monitoring node values;
- selecting one of the decision boundaries based on current wind information associated with the wind turbine;
- executing the abnormality detection model and transmitting an abnormality alert signal based on the set of current feature vectors and the selected decision boundary, the alert signal generating an automatic response to a cyber-attack; and
- wherein the abnormality detection model includes a below-rated normal power production decision boundary and an above-rated normal power production decision boundary, and said selection is based at least in part on a current wind speed and a threshold value associated with the wind turbine reaching its rated power.

15. The medium of claim 14, wherein the wind information is associated with at least one: (i) a wind speed, and (ii) a wind acceleration.

16. The medium of claim 14, wherein the abnormality detection model further includes a gust decision boundary.

17. The medium of claim 16, wherein the abnormality detection model further includes a power curtailment decision boundary.

* * * * *